United States Patent
Ding et al.

(10) Patent No.: US 11,733,377 B2
(45) Date of Patent: Aug. 22, 2023

(54) TIME OF FLIGHT AND CODE SIGNATURE DETECTION FOR CODED ULTRASONIC TRANSMISSION

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Anand Gopalan, Plano, TX (US); Vaibhav Garg, Plano, TX (US); Anand Ganesh Dabak, Plano, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1011 days.

(21) Appl. No.: 16/364,652

(22) Filed: Mar. 26, 2019

(65) Prior Publication Data
US 2019/0339386 A1  Nov. 7, 2019

Related U.S. Application Data

(60) Provisional application No. 62/667,802, filed on May 7, 2018.

(51) Int. Cl.
*G01S 15/10* (2006.01)
*G01S 15/931* (2020.01)
(Continued)

(52) U.S. Cl.
CPC .......... *G01S 15/104* (2013.01); *G01S 15/325* (2013.01); *G01S 15/582* (2013.01); *G01S 15/931* (2013.01); *G01S 2015/938* (2013.01)

(58) Field of Classification Search
None
See application file for complete search history.

(56) References Cited

U.S. PATENT DOCUMENTS 4,287,578 A * 9/1981 Heyser .................... G01S 13/26
                                                            367/102
5,961,463 A * 10/1999 Rhyne ................. G01S 7/52038
                                                            600/458
(Continued)

FOREIGN PATENT DOCUMENTS

CN      103348259 B    6/2015
DE    102008040248 A1   1/2010
(Continued)

OTHER PUBLICATIONS

Giannakis, Space-Time-Doppler coding over time selective fading channels with maximum diversity and coding gains, IEEE (Year: 2002).*

(Continued)

*Primary Examiner* — Isam A Alsomiri
*Assistant Examiner* — Vikas Atmakuri
(74) *Attorney, Agent, or Firm* — Ming Wai Choy; Frank D. Cimino

(57) ABSTRACT

In an ultrasonic detection system that uses frequency-modulation or phase-modulation coding to distinguish emitted bursts from multiple transducers, a receiver associated with a transducer uses peak search, peak buffer, and peak rank stages in one or more receiver signal processing paths to identify valid received ultrasonic signal envelope peaks in correlator outputs. The peak rank stage can support different modes respectively designed to handle one code, two or more codes, or two or more codes with support for Doppler frequency shift detection. Valid peak information (e.g., amplitude and time) can be reported to a central controller and/or stored locally in a fusion stage to generate more intelligent information for targets or obstacles using peaks from multiple bursts.

20 Claims, 17 Drawing Sheets

(51) Int. Cl.
G01S 15/32 (2006.01)
G01S 15/58 (2006.01)

(56) References Cited

U.S. PATENT DOCUMENTS

| | | | |
|---|---|---|---|
| 6,113,545 A * | 9/2000 | Chiao | G01S 7/52046 |
| | | | 600/447 |
| 6,289,282 B1 | 9/2001 | Hassler et al. | |
| 8,668,643 B2 | 3/2014 | Kinast | |
| 8,982,668 B2 * | 3/2015 | Horsky | H04L 27/02 |
| | | | 367/39 |
| 2002/0047780 A1 | 4/2002 | Nishimoto et al. | |
| 2004/0133104 A1 * | 7/2004 | Cohen-Bacrie | G01S 15/8915 |
| | | | 600/437 |
| 2004/0172101 A1 | 9/2004 | Van Hoesel | |
| 2004/0252048 A1 * | 12/2004 | Hager | G01S 13/935 |
| | | | 342/194 |
| 2005/0052950 A1 | 3/2005 | Klinnert et al. | |
| 2005/0075568 A1 | 4/2005 | Moehring | |
| 2005/0088334 A1 * | 4/2005 | Herder | G01S 15/003 |
| | | | 342/70 |
| 2006/0259281 A1 | 11/2006 | Kuppuswamy et al. | |
| 2008/0218324 A1 | 9/2008 | Li | |
| 2011/0029044 A1 | 2/2011 | Hyde et al. | |
| 2011/0267924 A1 * | 11/2011 | Horsky | G01S 15/931 |
| | | | 367/99 |
| 2012/0120768 A1 * | 5/2012 | Horsky | G01S 15/931 |
| | | | 327/60 |
| 2012/0272738 A1 | 11/2012 | Klessel et al. | |
| 2013/0028053 A1 | 1/2013 | Tsuji et al. | |
| 2013/0142011 A1 | 6/2013 | Hallek et al. | |
| 2013/0301391 A1 | 11/2013 | Altman et al. | |
| 2014/0155748 A1 * | 6/2014 | Pern | G06T 7/0012 |
| | | | 600/443 |
| 2014/0219062 A1 | 8/2014 | Rothberg et al. | |
| 2014/0331772 A1 | 11/2014 | Klotz et al. | |
| 2015/0253123 A1 * | 9/2015 | Braker | G06T 7/521 |
| | | | 356/610 |
| 2015/0323667 A1 * | 11/2015 | Przybyla | G01S 15/10 |
| | | | 367/103 |
| 2016/0044394 A1 | 2/2016 | Derom | |
| 2016/0161604 A1 * | 6/2016 | Clark | G01S 13/4418 |
| | | | 342/154 |
| 2016/0209493 A1 * | 7/2016 | Krasner | H04K 3/228 |
| 2016/0217686 A1 * | 7/2016 | Lee | G01S 7/527 |
| 2017/0003391 A1 * | 1/2017 | Hallek | G01S 15/876 |
| 2017/0363724 A1 * | 12/2017 | Reid | G01S 15/89 |
| 2018/0017671 A1 * | 1/2018 | Warke | G01S 13/08 |
| 2018/0203095 A1 * | 7/2018 | Xie | G01S 7/023 |
| 2018/0252803 A1 * | 9/2018 | Bilik | G01S 7/414 |
| 2019/0025415 A1 | 1/2019 | Suchy et al. | |
| 2019/0339385 A1 | 11/2019 | Nakamizo et al. | |
| 2019/0339386 A1 | 11/2019 | Ding et al. | |
| 2020/0033462 A1 | 1/2020 | Ding et al. | |
| 2020/0309945 A1 | 10/2020 | Ding et al. | |
| 2020/0400820 A1 * | 12/2020 | Nauen | G01S 7/484 |
| 2021/0156995 A1 | 5/2021 | Ding et al. | |
| 2021/0302548 A1 * | 9/2021 | Chen | H01L 31/107 |

FOREIGN PATENT DOCUMENTS

| | | | | |
|---|---|---|---|---|
| DE | 102011079706 | A1 | 1/2013 | |
| DE | 102012211293 | A1 | 1/2014 | |
| DE | 102012017367 | A1 | 3/2014 | |
| DE | 102012015967 | A1 | 5/2014 | |
| DE | 102013008235 | A1 | 11/2014 | |
| DE | 102013022273 | A1 | 11/2014 | |
| DE | 102013019431 | A1 | 5/2015 | |
| DE | 102013021845 | A1 | 6/2015 | |
| DE | 102017123052 | B3 | 2/2018 | |
| DE | 102018106244 | B3 | 6/2019 | |
| DE | 102018010254 | A1 | 9/2019 | |
| DE | 102018010255 | A1 | 9/2019 | |
| DE | 102018010257 | A1 | 9/2019 | |
| DE | 102018010258 | A1 | 9/2019 | |
| DE | 102018010260 | A1 | 9/2019 | |
| DE | 102018010261 | A1 | 9/2019 | |
| DE | 102018106251 | A1 | 9/2019 | |
| DE | 102019105651 | A1 | 9/2019 | |
| DE | 102019106190 | A1 | 9/2019 | |
| DE | 1020184106247 | A1 | 9/2019 | |
| DE | 1020191106432 | A1 | 9/2019 | |
| DE | 102018206649 | A1 | 10/2019 | |
| DE | 102017104145 | A1 | 11/2019 | |
| EP | 2737857 | A1 | 6/2014 | |
| FR | 2815128 | A1 | 4/2002 | |
| GB | 2534034 | A | 7/2016 | |
| GB | 2548461 | A | 9/2017 | |
| JP | 2627745 | B2 * | 7/1997 | G10L 15/00 |
| JP | 2004-526548 | A | 9/2004 | |
| JP | 2014-020795 | A | 2/2014 | |
| KR | 20160098362 | A | 8/2016 | |
| WO | 2012016834 | A1 | 2/2012 | |
| WO | 2012016841 | A1 | 2/2012 | |
| WO | WO-2012151869 | A1 * | 11/2012 | H04B 1/7077 |
| WO | 2014180609 | A1 | 11/2014 | |
| WO | 2015039805 | A1 | 3/2015 | |
| WO | 2015090842 | A1 | 6/2015 | |
| WO | 2016166763 | A2 | 10/2016 | |
| WO | 2018210966 | A1 | 11/2018 | |
| WO | 2019/217306 | A1 | 11/2019 | |

OTHER PUBLICATIONS

CN103348259B English Machine Translation, 19 pages.
KR20160098362A English Machine Translation, 11 pages.
International Search Report for PCT/US2019/030895 dated Sep. 22, 2019.
Search Report for PCT/US2019/68037, dated Apr. 16, 2020, 2 pages.
Extended European Search Report received for EP Application No. 19906212.6 dated Jan. 25, 2022, 9 pages.
Cross Referenced from U.S. Appl. No. 16/426,779. Office Action dated Aug. 31, 2021, pp. 1-28.
United States Patent and Trademark Office, Office Action for U.S. Appl. No. 16/426,779, dated Nov. 18, 2022; 1 page.
Japan Patent Office, Office Action, dated Mar. 31, 2023, 17 pages.

* cited by examiner

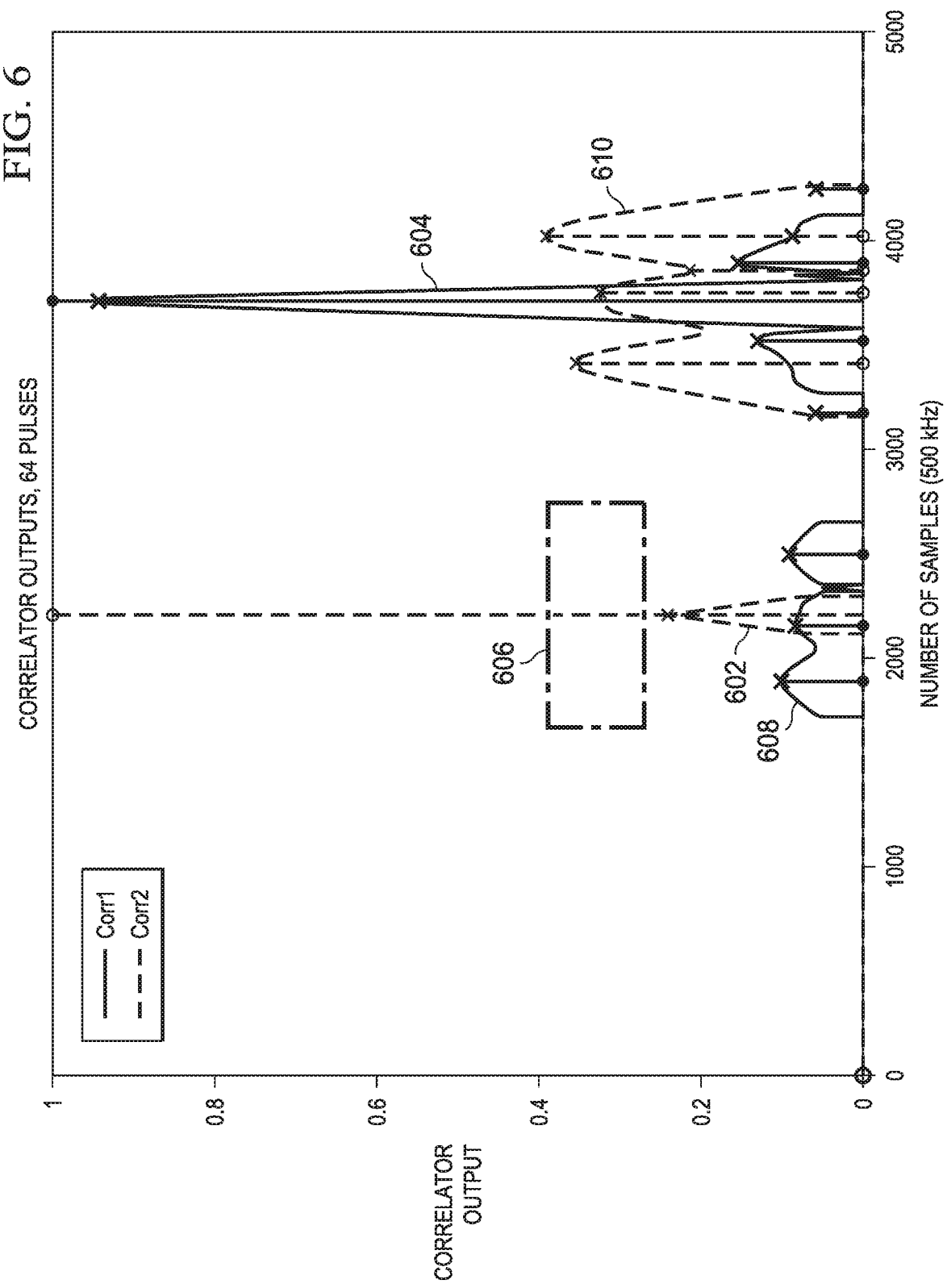

TIME OF FLIGHT AND CODE SIGNATURE DETECTION FOR CODED ULTRASONIC TRANSMISSION

CROSS-REFERENCE TO RELATED APPLICATION

This application claims priority to U.S. provisional patent application No. 62/667,802, filed in the U.S. Patent and Trademark Office on 7 May 2018. The provisional patent application is herein incorporated by reference.

TECHNICAL FIELD

This disclosure relates to electronic processing systems and methods, particularly for time of flight and code signature detection for coded ultrasonic transmission.

BACKGROUND

Ultrasonic ranging is used in a variety of applications. For example, in an automotive application, ultrasonic transducers can be arranged in a bumper or fender of an automobile. The transducers emit ultrasonic signals that reflect off nearby objects, if present, and sense the reflections. The round-trip time of the ultrasonic signals is measured so that distance to the object can be determined or, by processing reflection information from multiple transducers, the position of the object can be deduced. Collision avoidance can thereby be achieved, e.g., by presenting such determined or deduced information, or navigation information based thereon, to a warning system configured to present a warning signal to a human driver, or to an automated driving system configured to navigate a vehicle to avoid collisions with detected obstacles.

SUMMARY

An example ultrasonic sensing system includes burst generation circuitry, an ultrasonic transducer, and a receiver signal path. The burst generation circuitry generates a frequency-modulation-coded or phase-modulation-coded burst signal comprising a sequence of pulses of variable time duration. The ultrasonic transducer emits the burst signal as an ultrasonic acoustic signal and transduces a reflected acoustic signal. The receiver signal path is made up at least of a correlator, a peak search stage, a peak buffer, and a peak rank stage. The correlator correlates a received signal, sampled from the transduced reflected acoustic signal, with a transmission template characterizing a frequency-modulation or phase-modulation code of the generated burst signal. The peak search stage detects one or more peaks by determining the respective locations and amplitudes of peaks in an envelope derived from the output of the correlator. The determination is made such that, in the case that multiple peaks are detected, the peaks are greater than a threshold minimum distance apart from one another. The peak buffer stores the peaks by their amplitudes and locations. The peak rank stage compares the peaks stored in the peak buffer and thereby designates the peaks individually as either valid or invalid. Based on the valid peaks, the receiver signal path can compute a time of flight of the ultrasonic acoustic signal and the reflected acoustic signal indicative of a distance between the transducer and a detected object.

In another example, a method of ultrasonic detection includes generating a frequency-modulation-coded or phase-modulation-coded burst signal comprising a sequence of pulses of variable time duration, emitting an ultrasonic acoustic signal based on the burst signal, and transducing a reflected acoustic signal. A received signal, sampled from the transduced reflected acoustic signal, is then correlated with a transmission template characterizing a frequency-modulation or phase-modulation code of the generated burst signal. One or more peaks are then detected by determining the respective locations and amplitudes of peaks in an envelope derived from the correlated received signal. The detection is done with the constraint that, in the case that multiple peaks are detected, the peaks are greater than a threshold minimum distance apart from one another. The peaks are then stored by their amplitudes and locations, and the stored peaks are compared to designate them individually as either valid or invalid. A time of flight of the ultrasonic acoustic signal and the reflected acoustic signal indicative of a distance between to a detected object can then be computed.

In yet another example, an ultrasonic sensing system includes burst generation circuitry and a receiver signal path. The burst generation circuitry is configured to generate a frequency-modulation-coded or phase-modulation-coded burst signal comprising a sequence of pulses of variable time duration. The burst generation circuitry is adapted to be coupled to an ultrasonic transducer that is configured to emit the burst signal as an ultrasonic acoustic signal and to transduce a reflected acoustic signal. The receiver signal path includes a time-varying gain (TVG) amplifier, an analog-to-digital converter (ADC), a correlator, an envelope stage, a threshold stage, a peak search stage, a peak buffer, a peak rank stage, and a time-of-flight (ToF) generation stage, the ToF being indicative of a distance between the transducer and a detected object. The TVG amplifier is configured to amplify the transduced reflected acoustic signal. The ADC is configured to sample the amplified signal from the TGV amplifier. The correlator is configured to correlate the sampled signal from the ADC with a transmission template characterizing a frequency-modulation or phase-modulation code of the generated burst signal. The envelope stage is configured to generate an envelope of the correlator output. The threshold stage is configured to amplitude-threshold the envelope. The peak search stage is configured to detect one or more peaks by determining the respective locations and amplitudes of peaks in the thresholded envelope, the peaks being greater than a threshold minimum distance apart from one another, in the case that multiple peaks are detected. The peak buffer is configured to store the peaks by their amplitudes and locations. The peak rank stage is configured to compare the peaks stored in the peak buffer and thereby to designate each of the peaks as either valid or invalid. The ToF generation stage is configured to calculate the ToF of the emitted ultrasonic acoustic signal and the reflected acoustic signal based on a peak supplied by the peak rank stage.

BRIEF DESCRIPTION OF THE DRAWINGS

FIGS. 6 and 7 are graphs of example correlator outputs with identified and validated peaks.

DETAILED DESCRIPTION

Reflected ultrasonic signals can be detected by an ultrasonic transducer and used to measure round-trip time to thereby determine distance to an object that reflected the ultrasonic signals. For example, automotive applications can use one or more ultrasonic sensors to sense the distances of objects behind, along, or in front of a car. This application discloses systems and methods providing enhanced ultrasonic detection of obstacles, particularly when multiple ultrasonic transducers operate concurrently. Discrimination of echoes of ultrasonic signals produced by different transducers is improved by coding emitted signal bursts and processing received echoes with knowledge of such coding information.

Allowing concurrent operation of multiple transducers greatly improves the speed of the detection system and thereby also the responsiveness of the associated driver-warning or automated driving control system. The coding of the signal bursts from different transducers improves reflection detection by distinguishing the main peak in envelopes of correlated reflected signals, which main peaks correspond to true reflections, from peaks (main or subsidiary) corresponding to echoes sensed from other transducers. The present systems and methods use peak search, peak buffer, and peak rank logic to identify valid peaks in correlator outputs. The peak rank logic supports different modes, which are designed to handle one burst code, two or more burst codes, or two or more burst codes with Doppler detection. Validated peak information (e.g., amplitude and time) can be reported to a central controller and/or stored locally in fusion logic to generate more intelligent information about possible targets or obstacles using peaks from multiple bursts.

Figure 1:
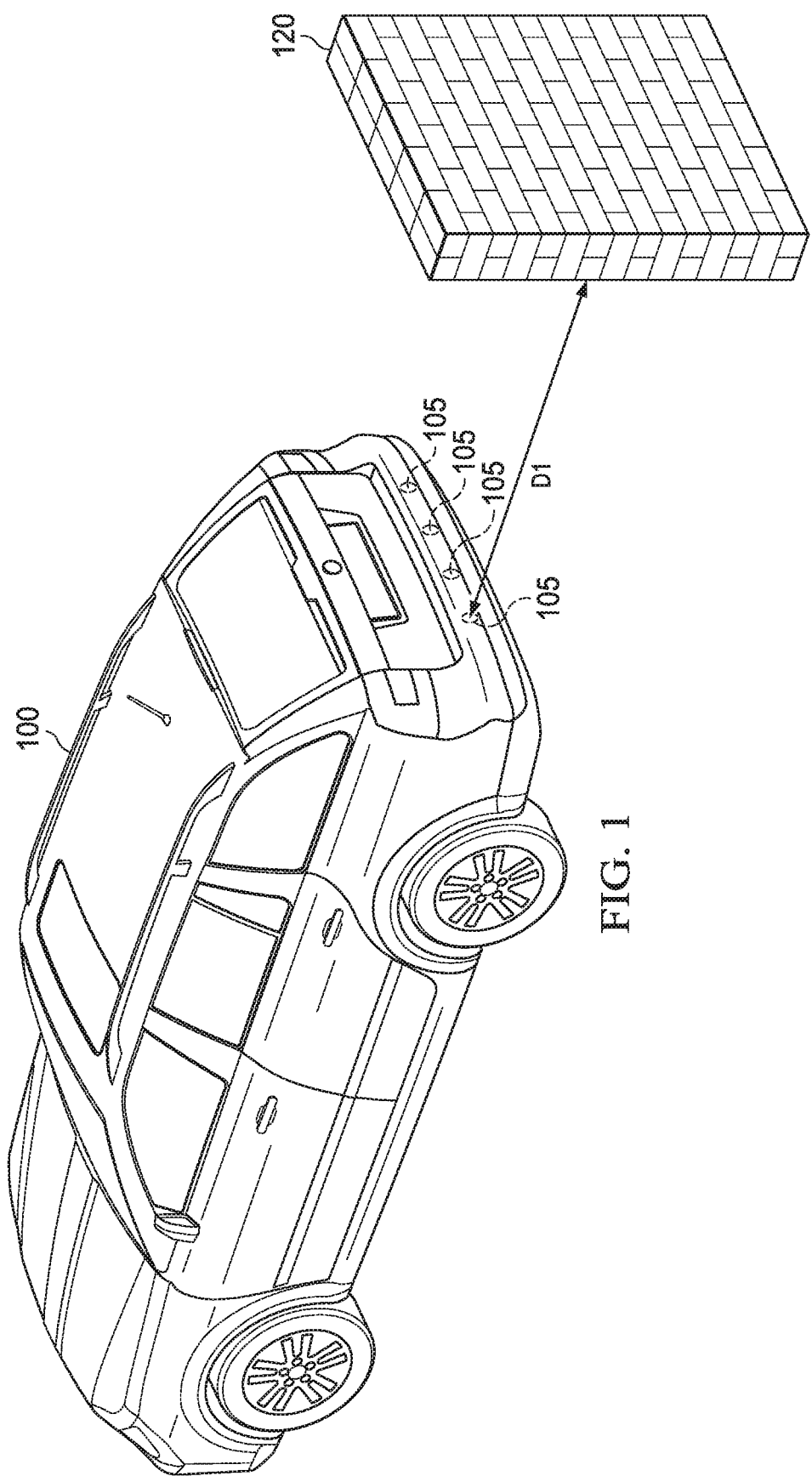
FIG. 1 illustrates an automobile with ultrasonic transducers to measure distance to an object.

FIG. 1 illustrates the use of a distance measuring (i.e., ranging) system based on ultrasound, namely, in an automobile 100 that includes one or more ultrasonic transducers 105 in the front and/or rear bumpers. In the example of FIG. 1, four ultrasonic transducers 105 are shown, but the number of transducers in each bumper can be other than four in other examples. As used herein, "transducers" refers to ultrasonic transducers. Any single transducer can function both to emit ultrasonic signals, transducing electrical signals into acoustical signals, and to sense reflected signals, transducing acoustical signals into electric signals. Each transducer 105 can, for example, emit sound waves and then can detect a reflection of the emitted sound waves after they have bounced off an object (e.g., object 120) and returned to the transducer. The elapsed time t between when the sound is first emitted from the transducer and when the reflected sound wave is detected back at the transducer can be measured by receiver circuitry coupled to the transducer. The total round-trip distance can be computed as the product of the speed of sound through air c (about 344 meters per second or 1,129 feet per second) and the measured time t. The distance D1 between the transducer and an object is then given by the formula $D1=ct/2$, where the division by two accounts for the fact that the reflected sound waves make a round trip back to the transducer.

In some examples, the sound wave signals are emitted as short bursts of sound at a specific frequency, typically above 20 kHz, e.g., at about 50 kHz. The emitted sound waves typically comprise a number of pulses, e.g., between about fifteen and one hundred pulses, e.g., between about twenty and sixty-five pulses. A controller (not shown in FIG. 1), which can, for example, implemented as an integrated circuit (IC) associated with and packaged with a single transducer 105, can drive the transducer 105 with an electrical driving signal. The transducer 105 can then convert the electrical driving signal into an acoustic sound wave going out of the transducer. A controller directing its associated transducer to emit a burst will herein be referred to as "bursting" the transducer. The transducer 105 converts a received reflected sound wave into an electrical signal and passes the transduced signal to a receiver in the controller configured to process the received signal. Internal to the controller is a timer that is started upon emission of the burst sequence, and, upon receipt of a valid echo, the value of the timer is recorded as the time-of-flight (ToF) of the echo. As noted above, this time-of-flight, divided by two and multiplied by the speed of sound in air, gives the distance between the transducer 105 and the reflecting object 120.

In some implementations, the transducers 105 all emit the same frequency (e.g., 50 kHz) but do so in sequential fashion, that is, one transducer 105 emits a sound signal and waits for a predetermined period of time for a reflection before the next transducer 105 is permitted to emit its sound signal. Without waiting, it can be ambiguous which transducer emitted the signal echoed, which in turn can diminish the accuracy of the determination of the position or distance of the reflecting object. Such waiting means that for an example maximum object detection range of five meters, about thirty milliseconds must elapse between sequential bursts of different transducers, which means that a single scan of a typical complement of four sensors takes one hundred twenty milliseconds. This length of time may be unacceptably long in time-critical applications such as those involving collision detection and warning.

By contrast to the single-tone implementations described above, the systems and methods described herein use coded-waveform burst signals, e.g., to distinguish between the burst signals of different transducers and thereby to reduce or eliminate the time needed between bursting of different transducers. Rather than using a single-tone burst signal, a frequency-modulated signal can be emitted by any one transducer, permitting, for example, disambiguation of return echoes resulting from multiple transducers. The burst signal may alternatively be phase-modulation coded.

In examples that use such frequency-modulation coding, each burst can consist, for example, of a pulse sequence resembling a square wave, but with each pulse in the waveform having a different duration corresponding to a different frequency. In some examples, the frequencies used to generate a given sound burst may range between a first frequency and second frequency and thus have a difference referred to as Δt. As an example, a first pulse in a burst can have a duration corresponding to a frequency of 48.0 kHz, a second pulse in the burst can have a duration corresponding to a frequency of 48.2 kHz, a third pulse in the burst can have a duration corresponding to a frequency of 48.4 kHz, and so on, until the twenty-first and last pulse in the burst, which can have a duration corresponding to a frequency of 52.0 kHz. The preceding represents but one example; other pulse frequencies and number of pulses per burst are also possible, as are arrangements of different-frequency pulses within the burst, beyond sequential frequency increase, as in this example, or, in other examples, frequency decrease, or frequency increase-then-decrease, or frequency decrease-then-increase.

Thus, in other examples, a burst can sweep up from a first frequency to a second, higher frequency and back down again to the first frequency or to a third frequency that is lower than the second frequency. In yet other examples, a burst can switch between two or more frequencies using a predefined pattern to create a unique coding signature. In still other examples, the burst can sweep down from a first frequency to a second, lower frequency and then back up to the first frequency or to a third frequency that is higher than the second frequency. Other modulation patterns are possible as well. Whatever the pattern, the particular sweep characteristics of the burst, in terms of pulse frequencies, number of pulses, time duration of pulses, and/or time-arrangement of pulses (e.g., by frequency, duration or otherwise) can act as a burst signature that is identifying of the transducer emitting the burst. Each transducer can have its own unique frequency modulation signature in the coded burst waveform it emits. Thanks at least in part to the above-described burst coding, no restriction need be placed on the overlapping of the frequency ranges of the sweep(s) in bursts from different transducers. Bursts can also be phase-modulation-coded rather than frequency-modulation-coded.

As described in greater detail below, receiver circuitry in the controller associated with a particular transducer can be equipped with a correlator. The correlator can be provided with a template that is sampled from a coded signal used to create the driving signal. Each transducer thereby correlates only to its own template. Specifically, because each transducer has a distinct frequency or phase modulation pattern, each transducer's receiver circuitry is able to correlate a received signal only to that transducer's own frequency or phase modulation signature. Owing to the distinctness of the different transducers' bursts, the bursts can temporally overlap, e.g., all of the transducers 105 can emit their sound signals concurrently or simultaneously. As each emitted sound signal is uniquely coded for a specific transducer 105, the reflected sounds signals are unique as well and can be differentiated by the receiver circuitry connected to each transducer.

Figure 2:
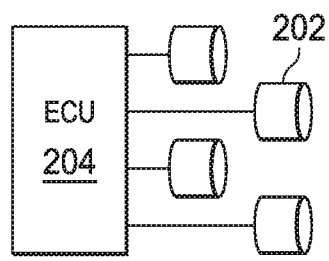
FIG. 2 is a high-level diagram showing the organization between a central controller and a number of ultrasonic sensor units each having a controller.

FIG. 2 shows the organization of a plurality of ultrasonic sensor modules 202 as directed by a central controller 204, e.g., an electronic control unit (ECU). Each sensor module 202 can comprise an associated individual controller (not specifically shown), which can be implemented, for example, as an integrated circuit (IC), and which is configured to drive an ultrasonic transducer (not specifically shown) in the sensor module 202 as well as to process a received signal that may contain echoes corresponding to targets or obstacles. After processing, the transducer-associated controller can send the processed echo information back to the central controller 204, which can collect processed echo information from multiple transducers (e.g., all four transducers, in the illustrated example) and triangulate the detected object based on the collected information from the multiple transducers. Central controller 204 can also perform some additional high-level processing, including processing to handle interference.

Figure 3:
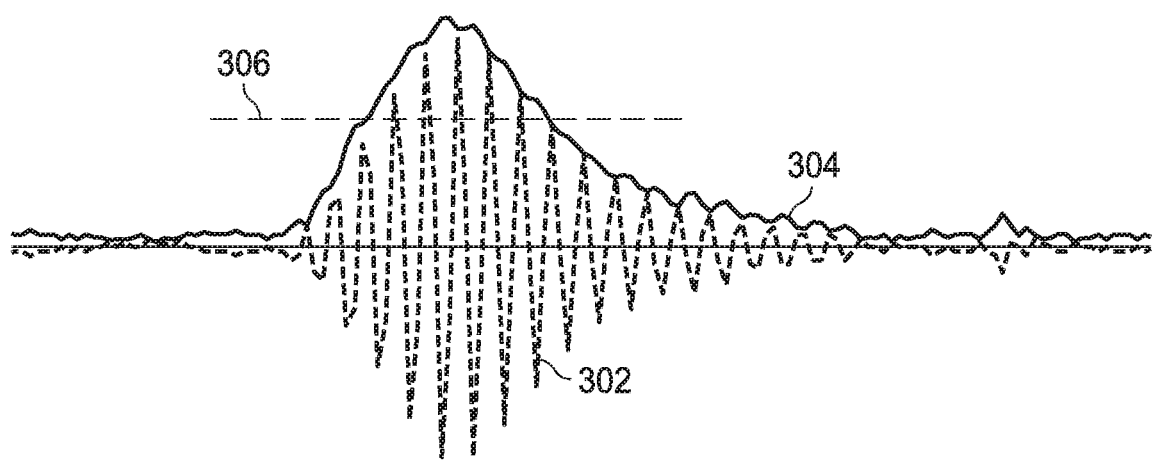
FIG. 3 is a graph of an example envelope of a sensed ultrasonic reflection.

FIG. 3 shows an example of a received echo signal 302 and its envelope 304. The echo signal 302 can be received as an acoustic signal by an ultrasonic transducer and converted into an electrical signal, which can be amplified and sampled by an analog-to-digital converter in the individual controller associated with the transducer. The individual controller can then generate the envelope 304 from the sampled received signal 302. The individual controller can further be configured to compare the envelope to a threshold 306. An envelope exceeding the threshold can be declared a valid echo corresponding to a detected target or obstacle (as opposed to merely being noise, for example, whether acoustic environmental noise or electrical noise inherent in the receiver signal path), and a time-of-flight can be computed based on the time elapsed between burst emission and echo receipt.

Figure 4:
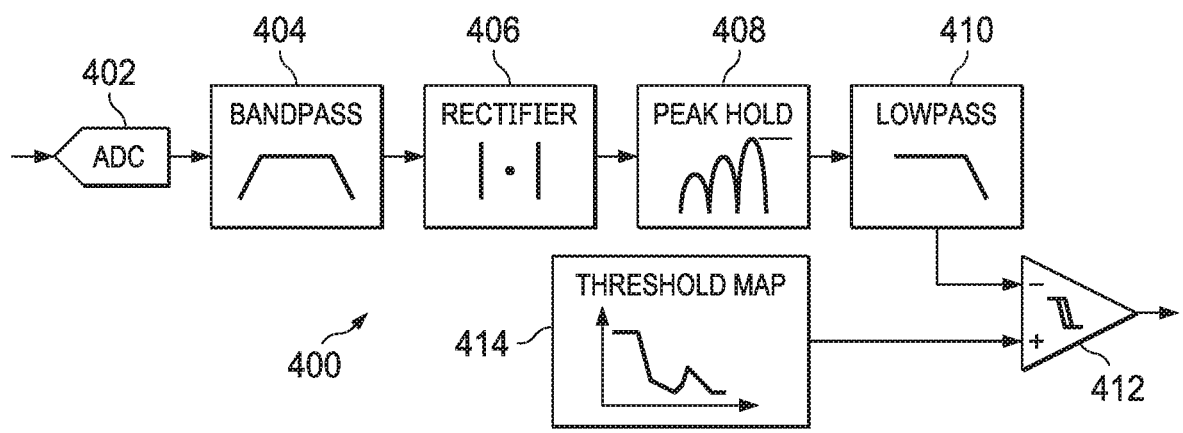
FIG. 4 is a block diagram of an example portion of a received signal processing path in an ultrasonic transducer controller.

The threshold 306 illustrated in FIG. 3 need not be a single-value static threshold. In some examples, the threshold can vary with respect to time, e.g., starting from the time of burst emission. FIG. 4 shows an example receiver signal path 400 that can be used in an individual controller associated with a transducer in a sensor module 202, which makes use of a time-varying threshold map. An analog electrical signal transduced by an ultrasonic transducer from a received acoustic signal can be sampled by an analog-to-digital converter (ADC) 402. The ADC output can then go to a bandpass filter 404. A rectifier 406, a peak hold stage 408, and a low pass filter 410 can be used to reconstruct the envelope of the received signal, which is compared, using comparator 412 with threshold map 414, to either declare the envelope as signifying a valid echo from an object or not. Having passed the threshold and the reflecting object thereby having been declared a valid object, the time-of-flight can then be recorded, which information can be sent back to a central controller 204 (e.g., ECU).

Figure 5A:
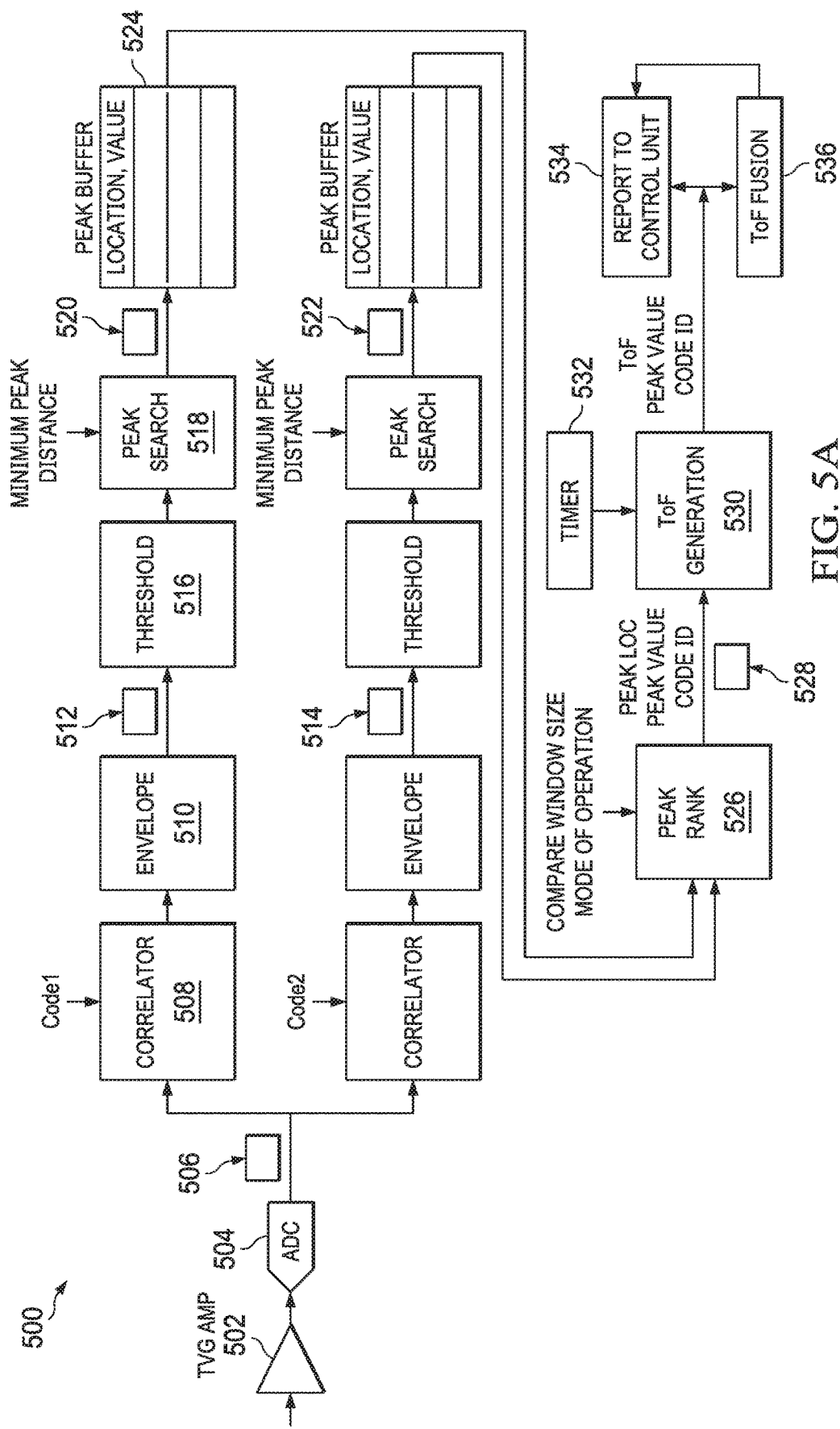
FIG. 5A is a block diagram of an example portion of a received signal processing path in an ultrasonic transducer controller.

FIG. 5A shows an example receiver signal path 500 in a system that employs coded processing to distinguish two or more coded signals, e.g., from two or more different ultrasonic transducers each emitting a burst signature having its own signature frequency-modulation or phase-modulation code. These codes are denoted as "Code1" and "Code2" in FIG. 5A, which, for the sake of simplicity, shows a two-code example. Other examples can accommodate more codes (e.g., four codes) by implementing additional parallel processing paths between ADC 504 and peak rank stage 526, one such path for each code. The example receiver signal path 500 uses multiple correlators 508 and corresponding post-processing for identifying valid peak information and code ID.

The receiver to which receiver signal path 500 belongs is triggered to begin processing received signals by the start of the emission of the burst by the ultrasonic transducer with which the receiver is associated. In receiver signal path 500, an analog electrical signal, which is transduced from a received acoustic signal by the ultrasonic transducer, can be amplified by time-varying gain (TVG) amplifier 502 and sampled by ADC 504. The time-varying output of ADC 504, in the illustrated example, has two correlators in two parallel signal processing paths. The first correlator 508 receives a first transmit (TX) template, labeled Code1, providing information about a first code used by a first burst pattern. The second correlator receives a second TX template, denoted Code2, corresponding to a second code used by a second burst pattern. For example, a first transducer can emit bursts having the Code1 signature, and a second transducer can emit bursts having the Code2 signature. When both transducers emit their respective bursts contemporaneously, both codes can be observed in received reflection signals having echoes reflected from the same external object. The receiver associated with one transducer may observe reflections from bursts of two (or more) different transducers that have emitted their differently-coded bursts contemporaneously. The processing carried out in each of the parallel paths of receiver signal path 500 provides a way to determine whether an echo observed by the receiver is a reflection from a coded burst signal emitted by the first transducer, e.g., with Code1, or a reflection from a coded burst signal emitted by the second transducer, e.g., with Code2.

Figure 5B:
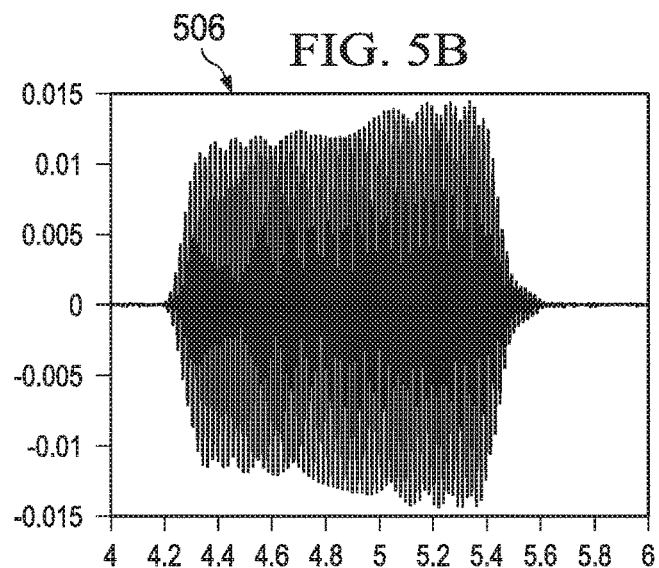
FIGS. 5B-5G are signal plots referred to in FIG. 5A.
Figure 5C:
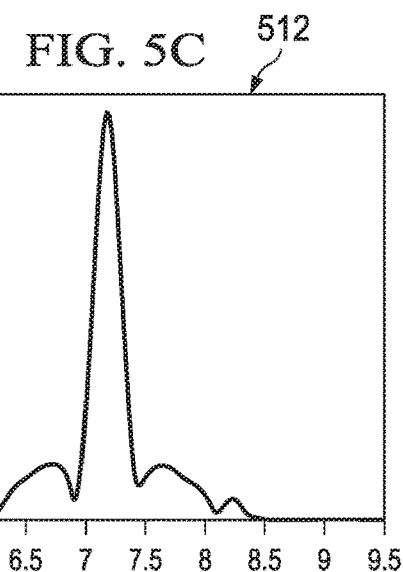
Figure 5D:
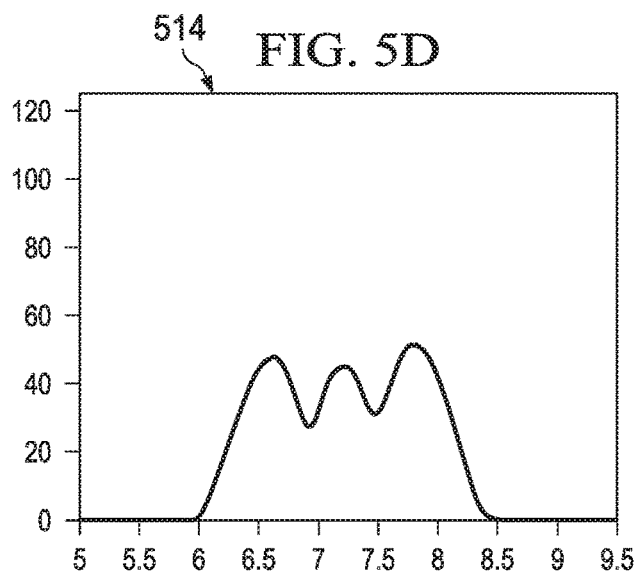

In FIG. 5B, the example ADC output 506 is shown as a time-domain waveform with approximately eighty pulses. In various other examples, bursts can have more or fewer pulses. After being processed with a respective correlator 508, the envelope of the ADC output 506 is reconstructed with envelope stage 510. As can be seen in the graph of Code1 path envelope stage output 512, shown in FIG. 5C, the Code1 echo has a large autocorrelation peak. The Code2 echo has several cross-correlation peaks, as shown in the graph of Code2 path envelope stage output 514 in FIG. 5D. As used here, "autocorrelation" refers to the correlator output when the code ID of the received echo matches the code ID of the correlator template, and "cross-correlation" refers to the correlator output when the code ID of the received echo does not match the code ID of the correlator template. The goal of the processing performed by receiver signal path 500 is to be able to tell whether a received echo is a Code1 echo or a Code2 echo, e.g., whether a received echo corresponds to a reflection of a burst emitted by a first transducer or to a reflection of a burst emitted by a second transducer, and then to be able to record the location and amplitude of the peak of the envelope of the reflected signal for reporting back to a central controller (e.g., an ECU).

The output of each respective envelope stage 510 feeds into a respective threshold stage 516, in which a respective generated envelope (e.g., envelope 512 or envelope 514) is compared with a threshold. The threshold can be set, for example, to be higher than a certain noise level so as to avoid false positive triggering of object detection from underlying electrical noise in the received signal path or acoustic noise in the environment. In certain cases, it may also be desirable to avoid triggering from certain types of objects and/or objects at certain distances. The threshold can be set higher to suppress detection of such objects. As an example of the functioning of the thresholding stage 516, following threshold stage 516, any part of the input envelope signal falling below the threshold is zeroed, whereas any part of the input envelope signal exceeding the threshold will be kept the same value. The threshold need not be a value that is constant with respect to time, but itself can be a time-varying signal that can be pre-defined and/or generated dynamically.

After each respective threshold stage 516, a respective peak search stage 518 performs a peak search to find the locations of peaks in the thresholded envelope waveform. In order to reduce the number of peaks that each signal path processes, the peak search is subject to a minimum peak distance between the peaks, which distance is provided as an input to each peak search stage 518. This minimum peak distance can be programmatically assigned as a constant or can be dynamically generated according to information about peaks in the envelope of the sampled reflection signal. This minimum peak distance can be set, for example, to be about the width of a main autocorrelation peak, such as seen in graph 512 in the Code1 processing path example. It may be that within this minimum peak distance, one peak cannot practically be separated from another. This peak distance thresholding aspect of peak search stage 518 helps reduce the number of peaks that are processed by each respective signal processing path so that only relevant peaks are retained for processing, e.g., by peak rank stage 526.

Figure 5E:
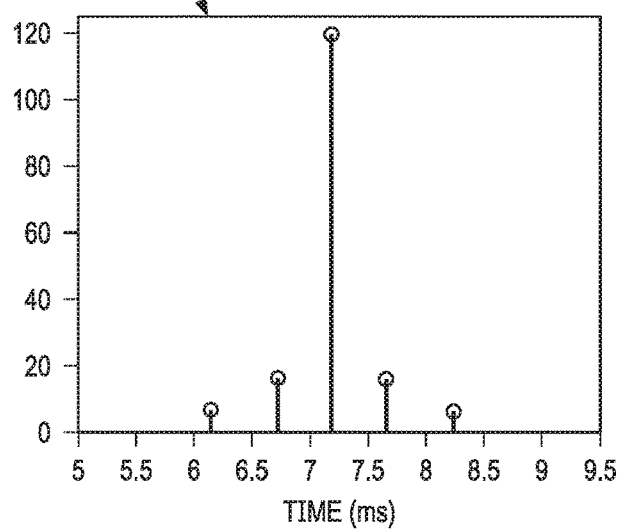
Figure 5F:
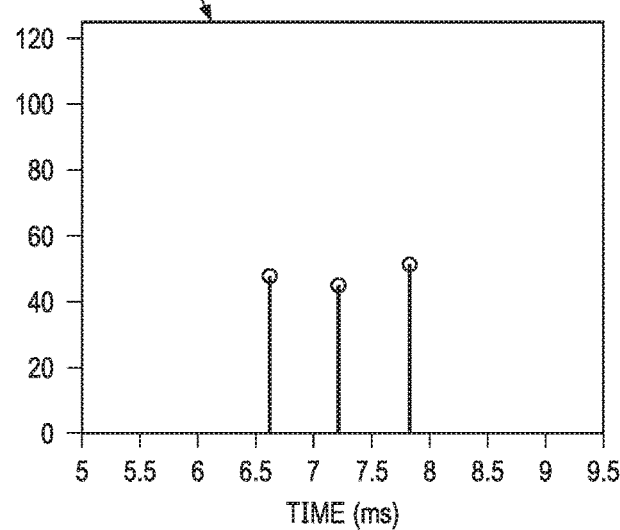
Figure 5G:
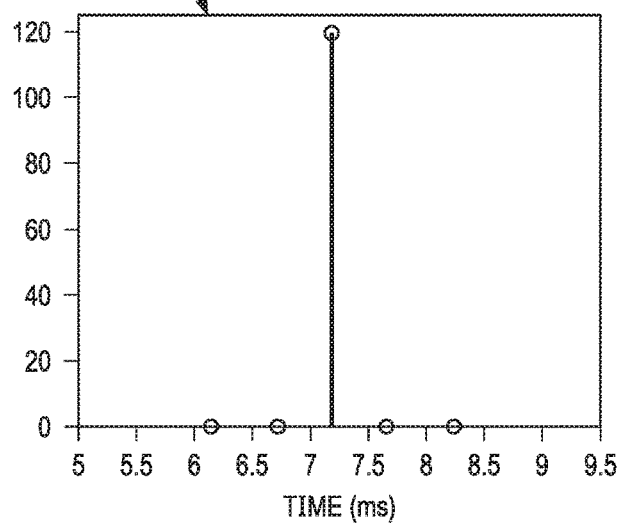

As indicated in Code1 processing path peak graph 520, shown in FIG. 5E, five peaks are located. As indicated in Code2 processing path peak graph 522, shown in FIG. 5F, three peaks are located. These peaks are written to a peak buffer 524 in each parallel data path that stores the location and amplitude of each detected peak. A peak rank stage 526, at which the parallel signal processing paths converge, compares the peaks coming out of the multiple data paths and determines whether the detected echo should be designated a Code1 echo (i.e., a reflection corresponding to a burst coded with Code1) or a Code2 echo (i.e., a reflection correspond to a burst coded with Code2). An example output 528 of peak rank stage 526 is shown in FIG. 5G. For any valid peaks detected, peak rank stage 526 can then record the peak location and the amplitude of any peaks along with a code identifier indicative of the code to which such peaks belong. As an example, peak rank stage 526 can be configured to record only peaks having the code with which the overall receiver signal path 500 is associated (by virtue of a receiver being associated with a single transducer). (Even though one receive path is associated with one transducer, the transducer can still receive other codes in the air, and the receiver can correctly identify the peak location of other codes through other correlators with templates set as other codes.) Thus, for example, if receiver signal path 500 is in a controller associated with a transducer that emits Code1-coded bursts, peak rank stage 526 can be configured to record only Code1 peaks. Control inputs to peak rank stage 526 can include a size 2 win of a sliding compare window and a mode of operation, designating, for example, whether the peak rank stage 526 should report out only dominant peaks or both dominant and secondary peaks. These control inputs can be provided, for example, by a central controller (e.g., an ECU).

Because each peak location in time is relative to the start of the burst, once the peak location(s) and amplitude(s) have been recorded, the time-of-flight (ToF) can be determined for each peak in time-of-flight generation stage 530. A timer 532 keeps track of time from the start of an emitted burst until the end of the listening period, which is determined by the range of expected targets/obstacles. The elapsed time determined by time-of-flight generation stage 530 from the provided peak location (which is a time value corresponding to a time that an echo resulting from the burst is observed at the transducer), multiplied by the speed of sound, and divided by two (to account for round trip of the acoustic signal from transducer to object and back), gives the detected distance of the object. Timer 532 can track the elapsed time from the burst starting time of each code (including the code associated with the transducer with which receiver signal path 500 is associated and/or other codes).

Along with a corresponding peak amplitude and code ID, the determined time-of-flight and/or object distance can be reported back to a central controller (e.g., ECU) 534, and/or can be provided to a time-of-flight fusion stage 536, which stores time-of-flight information from multiple bursts and uses the stored information to confirm the validity of a detected object. If a suspected target is detected, with multiple bursts, to be in the same location (accounting, for example, for known movement of a vehicle in which the ultrasonic detection system is incorporated), the confidence level of the valid target/obstacle in a particular location is correspondingly raised, whereas a target location that moves around significantly may indicate a false positive object location identification (i.e., not a real object). Thus, the keeping track of multiple bursts by fusion stage 536 helps determine whether peaks identified in any one burst are consistently valid across the multiple bursts. Still further, the properties of a detected object, such as the type of object (e.g., walking pedestrian or moving bicycle), can be inferred by the movement of an object, and fusion stage 536 can be configured to ascertain such properties by, for example, comparing recorded object movements to a database, by using a neural network, or with other identification schemes. As indicated, any fusion results can also be reported to a central controller (e.g., ECU) 534.

Figure 7:
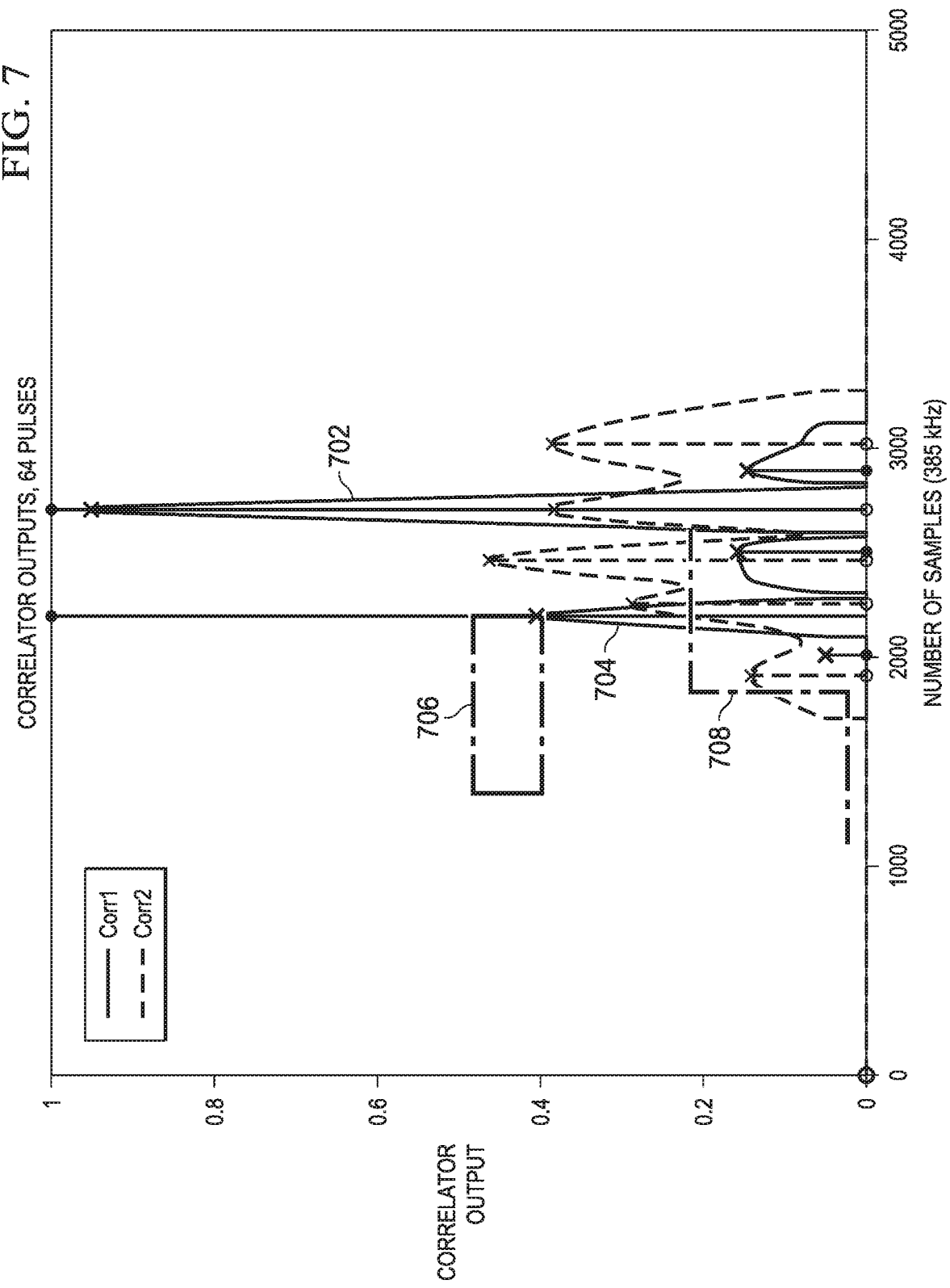

FIGS. 6 and 7 show example graphs illustrating correlator signal processing path outputs and the functioning of peak rank stage 526 to validate peaks detected by different correlators 508. The solid-line plot shows the thresholded envelope of the correlator 1 output; the broken-line plot shows the thresholded envelope of the correlator 2 output. The aim of the processing is to find the dominant peaks from the two correlator outputs. The amplitudes of identified peaks are marked with X's. Validated peaks are indicated by circles at the top of the graphs connected to the peaks by vertical lines indicating the peak locations (by sample number, which is the equivalent of time), whereas invalidated peaks are indicated by circles at the bottom of the graphs.

In FIG. 6, a sliding window 606 is used for peak validation. Window 606 slides across in time, or, equivalently, across sequential samples, as illustrated in FIG. 6. Sliding window 606 can slide, for example, from sample number n=0 to sample number n=5,000. When there is a peak in the middle of window 606, the peak can checked for validation by a process described below with respect to the flow diagram of FIG. 9. In summary, the current time index of window 606 is compared for equality to a peak location plus the window size, i.e., when the peak location is at the middle of the sliding comparison window 606 having extents n−2win to n. If a peak is at the middle of window 606, as shown in FIG. 6, the size of the particular peak is compared with the maximum of all peaks found by other correlators within the window at that instant. Thus, in the example of FIG. 6, correlator 2 peak 602 is compared against correlator 1 peaks 608, which are within the window 606, and when sliding window 606 slides further in time to evaluate correlator 1 peak 604, that peak will be compared against correlator 2 peaks 610. If the peak amplitude is larger than the amplitude of all peaks from other correlators in the window, then the peak is declared a valid peak. If, on the other hand, the peak amplitude is not larger than the amplitude of all the other-correlator peaks in the window, then the peak is declared not to be a valid peak, and the method proceeds to the next sample index (i.e., back to the beginning of the process illustrated in FIG. 9).

In the example of FIG. 6, the correlator 2 (broken-line) thresholded envelope waveform will have a valid peak 602 declared at around sample number 2,200 after this processing, but all the correlator 1 (solid-line) peaks in the 1,500 to 3,000 sample range will be declared invalid peaks. From the 3,000 to 5,000 sample range, the correlator 1 (solid-line) peak 604 will be determined to be the valid peak, whereas all the correlator 2 (broken-line) peaks within than range will be determined to be invalid as cross-correlations from the correlator.

When a Code1 echo is processed through the two correlators of FIG. 5A, the Code1 correlator 508 will see a large peak, but there is still some residual cross-correlation between the Code1 echo and the Code2 template. That residual cross-correlation between the Code1 echo and the Code2 template is shown by the broken-line peaks in the 3,000 to 5,000 sample range in FIG. 6. Because the Code1 peak 604 is much higher than the Code2 peaks in that sample range, peak rank stage 526 of FIG. 5A is able to tell that the echo observed between 3,000 and 5,000 samples in FIG. 6 is an echo of a Code1-encoded burst, and not an echo of a Code2-encoded burst.

FIG. 7 illustrates the functioning when peak rank stage 526 is set by mode of operation control input to report not only dominant peaks but also secondary peaks. When sliding window 706 first crosses correlator 1 (solid-line) peak 704 between sample numbers 2,000 and 2,500, peak 704 is validated as a secondary peak, above secondary peak threshold 708, despite a larger correlator 2 peak at approximately 2,500 samples coming within the width specified by sliding window 706. Peak 702 is reported as the dominant correlator 1 peak and peak 704 is reported as a secondary correlator 1 peak. All other peaks are invalidated. Note that secondary peak threshold 708 is not the same thing as the threshold provided by threshold stage 516.

Figure 8:
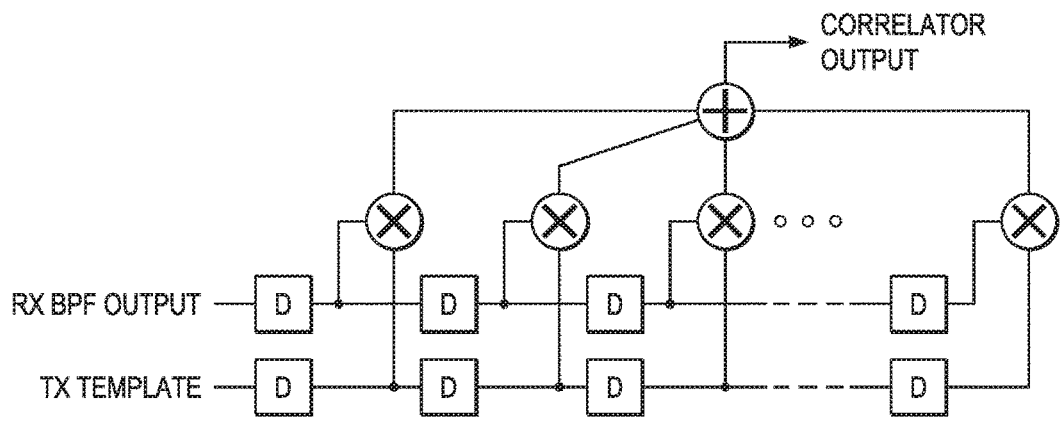
FIG. 8 is a signal flow diagram of an example correlator.

FIG. 8 shows a simplified example signal flow diagram of a correlator that can correspond to either of correlator stages 508 in FIG. 5A. The correlator input (the sampled received signal denoted RX BPF Output) and the TX template can be put into a memory buffer to allow pipeline operation of the adder and multiplier to save area. The depth of the correlation is equal to the number of samples in the resampled TX template, which is equal to the number of samples in the sampled received signal (RX BPF Output). Each box labeled "D" represents a one-sample delay unit. The number of delay units in the TX template path is equal to the number of samples in the resampled TX template, which is equal to the number of delay units in the sampled received signal path. Each circle labeled "x" represents a multiplication of samples from the two inputs. The circle labeled "+" represents an addition, i.e. accumulation, of the various multiplied samples. In operation, the TX template stays fixed while the sampled received signal slides for each time index that a new sampled received signal input is received (previously received samples of the sampled received signal are shifted through the chain from left to right). At each time index, receive (RX) samples are multiplied with the TX template and they sum together to provide the correlator output at the given time index. The two-code system of example 500 has one correlator input, but it can be correlated with two TX templates (for 2 codes), and generate two correlator outputs.

Figure 9:
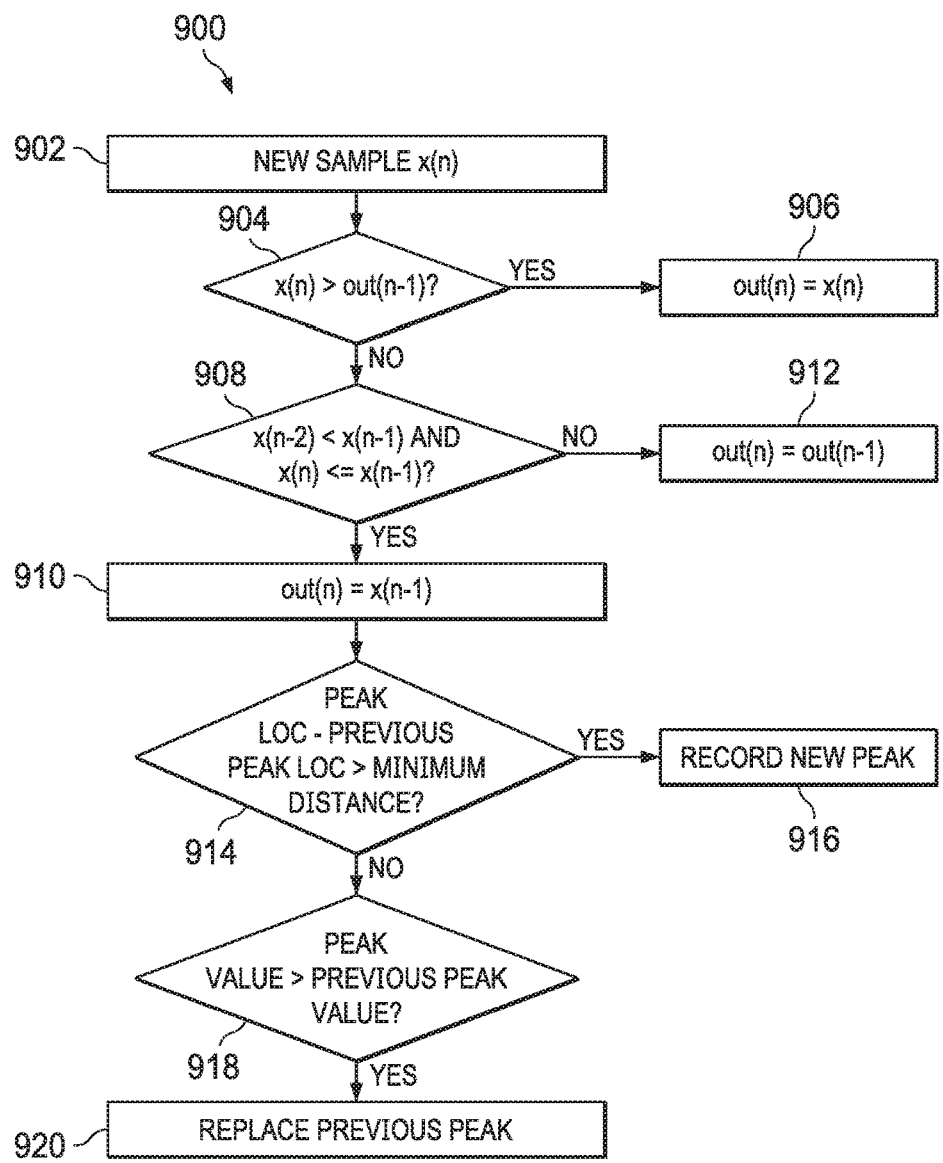
FIG. 9 is a flow diagram of an example peak detection method.

FIG. 9 shows an example peak search method 900 having a specified minimum peak distance, as may be performed by peak search stage 518 in FIG. 5A. A storage unit out that is stored, for example, in a buffer, keeps a previously stored value (out can be initialized to zero as a default). As each new thresholded envelope sample x(n) is introduced 902, the new sample is compared 904 to the previously stored value in the storage unit. If the current amplitude value x(n) is larger than the stored value out(n−1), then the stored value is overwritten 906 with the current input. Else, if the current input starts to go down after having reached a peak value 908, meeting the conditions x(n−2)<x(n−1) AND x(n)≤x(n−1), the method 900 starts to record this value in the storage unit 910. Otherwise, the storage unit retains the same value 912.

Method 900 thus detects a potential peak location, and can further compare this newly detected potential peak location with previously recorded peak locations, to see whether or not this newly detected potential is larger than the minimum distance from the previously recorded peak locations. If the last peak is more distant from the newly identified potential peak than the minimum distance 914, then the newly identified potential peak is declared a confirmed peak and is so recorded 916; if, on the other hand, the last peak is less distant from the newly identified potential peak than the minimum distance 914, then the newly identified potential peak is only a confirmed peak (and replaces the previous recorded peak 920) if it is larger in amplitude than the previously recorded peak 918.

The minimum peak distance can be set as about the width of the autocorrelation pulses, e.g., about 1/B samples, where B is the bandwidth of the transducer. Since there may be multiple peaks around the top of the autocorrelation function, the minimum peak distance is used to avoid capturing multiple closed-spaced peaks. The minimum peak distance can be, for example, a programmable register setting. As an example, if transducer bandwidth B=5 kHz, and the transducer frequency is 55 kHz, then the minimum peak distance can be approximately equal to 1/5000×55,000×7 (for oversampling)=77 samples, where 7 is the ratio of ADC sampling rate divided by the transducer frequency. It is primarily determined by the bandwidth of the antialiasing filter in front of the ADC. If B is varied by from 1 kHz to 8 kHz and the transducer frequency is varied from 40 kHz to 80 kHz, the minimum peak distance can be set as round(1/B×transducerFrequency×7). Note that this number is in terms of ADC samples. It can also be a number that represents time as round(1/B×transducerFrequency×7/ADCSampleRate).

Figure 10:
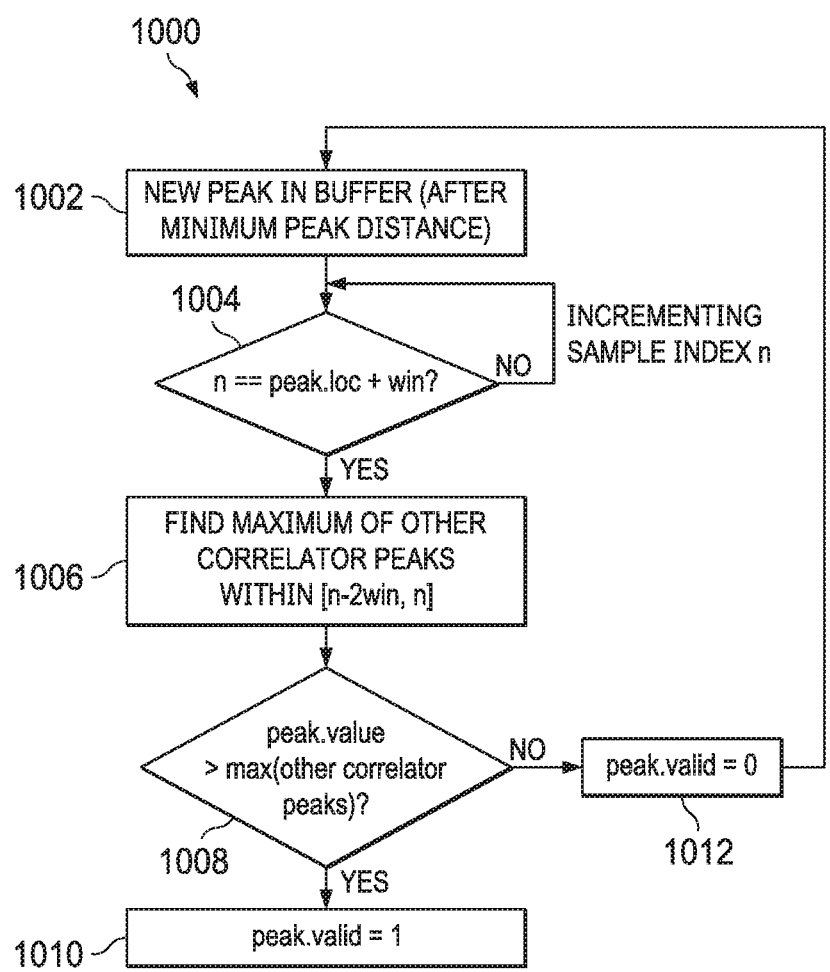
FIGS. 10 and 11 are flow diagrams of example peak validation methods.
Figure 11:
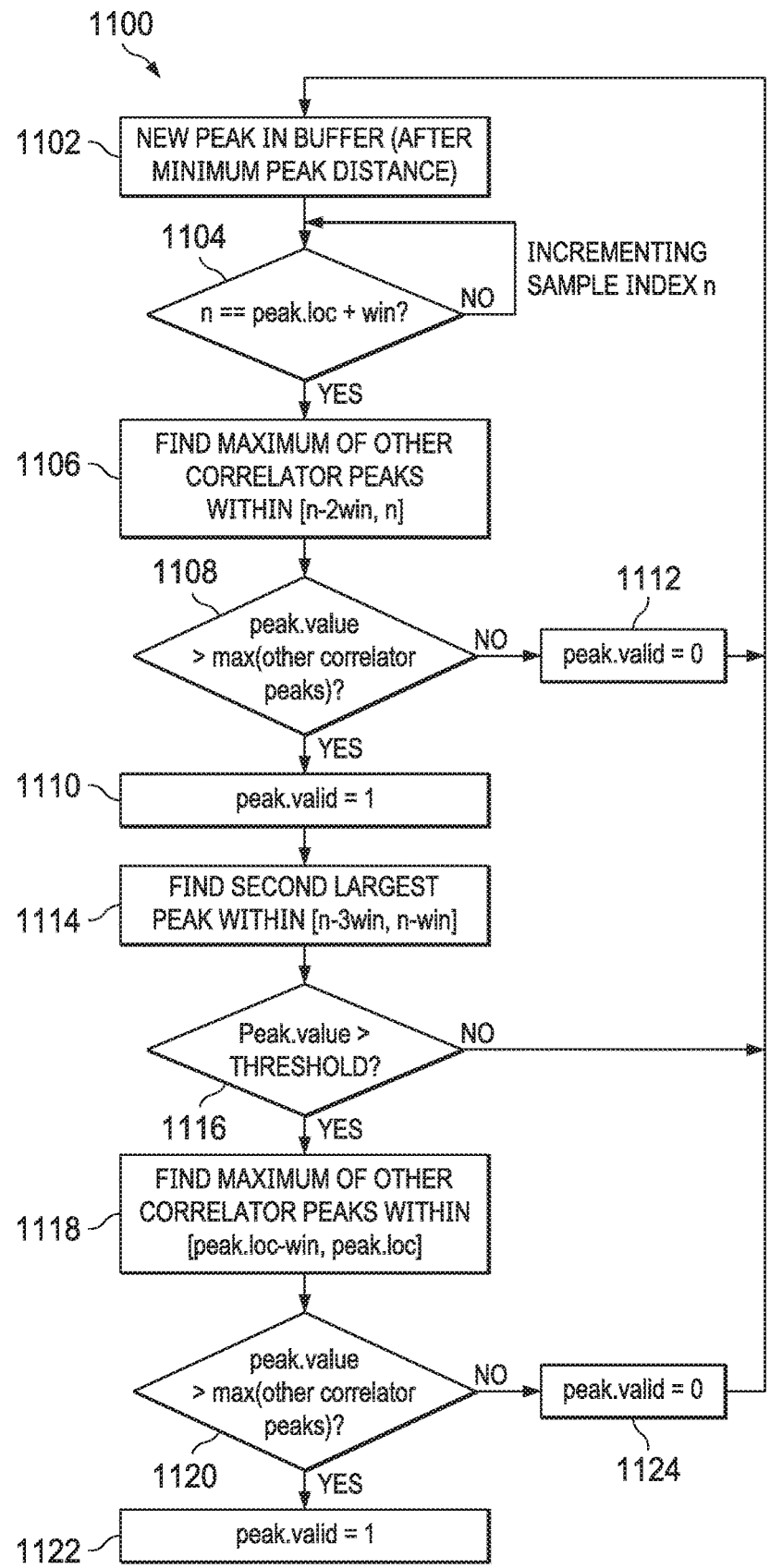

FIGS. 10 and 11 show example peak rank methods 1000 and 1100, respectively. The peak rank stage 526 of FIG. 5A is used to determine whether a peak is valid or not, and the code ID of a valid peak. Method 1000 of FIG. 10 illustrates one mode of functioning of peak rank stage 526, and can be viewed with regard to the graph of FIG. 6. If an input peak 1002 is at the center location of the time window 606 (the width 2 win of which can be, for example, a programmable register setting), as indicated by the condition n==peak.loc+win, then that peak is compared 1008 with the peaks in all other correlator outputs, i.e., against peaks from different correlators, within the same time window 1006. If the input peak is the largest, then it is declared to be a valid peak 1010. Its peak location, amplitude, and code ID (correlator number) are then recorded and kept in the peak buffer. If, however, the input peak is not the largest among peaks in the same window, it is declared invalid 1012 and the process begins for the next input peak. If the input peak is not at the center of the sliding window 1004, the sample index n is incremented, thereby sliding the window, and the middle of the window is checked for a peak again 1004.

With respect to method 1000, the graph of FIG. 6 shows an example using two correlators. Sliding window 606 is the time window to be checked. At the particular time shown, the correlator 2 peak being checked 602 is at the center of the window 606, and it is the largest across all correlator output peaks within the window. Therefore, peak 602 is declared as a valid peak.

The approach 1000 in FIG. 10 is configured to only detect the dominant peak in the window. Thus, if there is a small object in front of a big object, it may be missed if the cross-correlation of the large object is larger than the autocorrelation peak of the small object. To detect the small object, method 1000 can be modified, as in method 1100, to continue to search for secondary peaks after locating a valid dominant peak. The upper portion of method 1100 functions identically to method 1000 in FIG. 10, and portions 1102-1112 of method 1100 function identically to portions 1002-1012 of method 1000. As shown in the flow diagram of FIG. 11, which can be viewed with regard to the graph of FIG. 7, after locating the dominant peak 1110, the second largest peak is found 1114 within the 2 win window size previous in time to the dominant peak.

If this identified secondary peak is larger 1116 than a predetermined secondary peak threshold (indicated in FIG. 7 as secondary peak threshold 708), then it is determined whether 1120 this peak is larger than peaks from other correlators 1118 within the window prior in time to this secondary peak's location. (Thus, note that in box 1118 in FIG. 11, peak.loc is the location of the newly found secondary peak, and not the same as peak.loc in diamond 1104.) If that is also true, then this secondary peak is also declared a valid peak 1122. The secondary peak threshold (e.g., threshold 708) can be defined, for example, to ignore side lobes from the dominant peak. For example, as shown in FIG. 7, the threshold can be set to 0.25 times the amplitude (i.e., height) of the detected dominant peak within one-half window width on either side of the detected dominant peak, and 0 outside of one-half window width on either side of the detected dominant peak. If the identified secondary peak is not larger than peaks from other correlators 1118 within the window prior in time to this secondary peak's location, then it is declared an invalid peak 1124.

If the previous approach 1000 of FIG. 10 is used in the instance shown in the graph of FIG. 7, correlator 1 peak 704 will be declared as invalid because it is not larger than all the other peaks in the correlator 2 output. A correlator 2 peak, at about 2,500 samples, comes within the window and is larger than peak 704. In order not to miss this smaller peak 704, once the dominant peak 702 has been validated, method 1100 can be used to see whether any of the other correlator 1 peaks in front of it should also be validated as secondary peaks. This validation of smaller peaks in front of a large peak can help the ultrasonic detection system to detect small objects in front of larger objects. As an example, in the context of an automotive application, method 1100 can help ensure detection of a thin signpost between an automobile and a large wall, where the signpost might otherwise go undetected in view of the dominant acoustic reflection produced by the wall.

Figure 12:
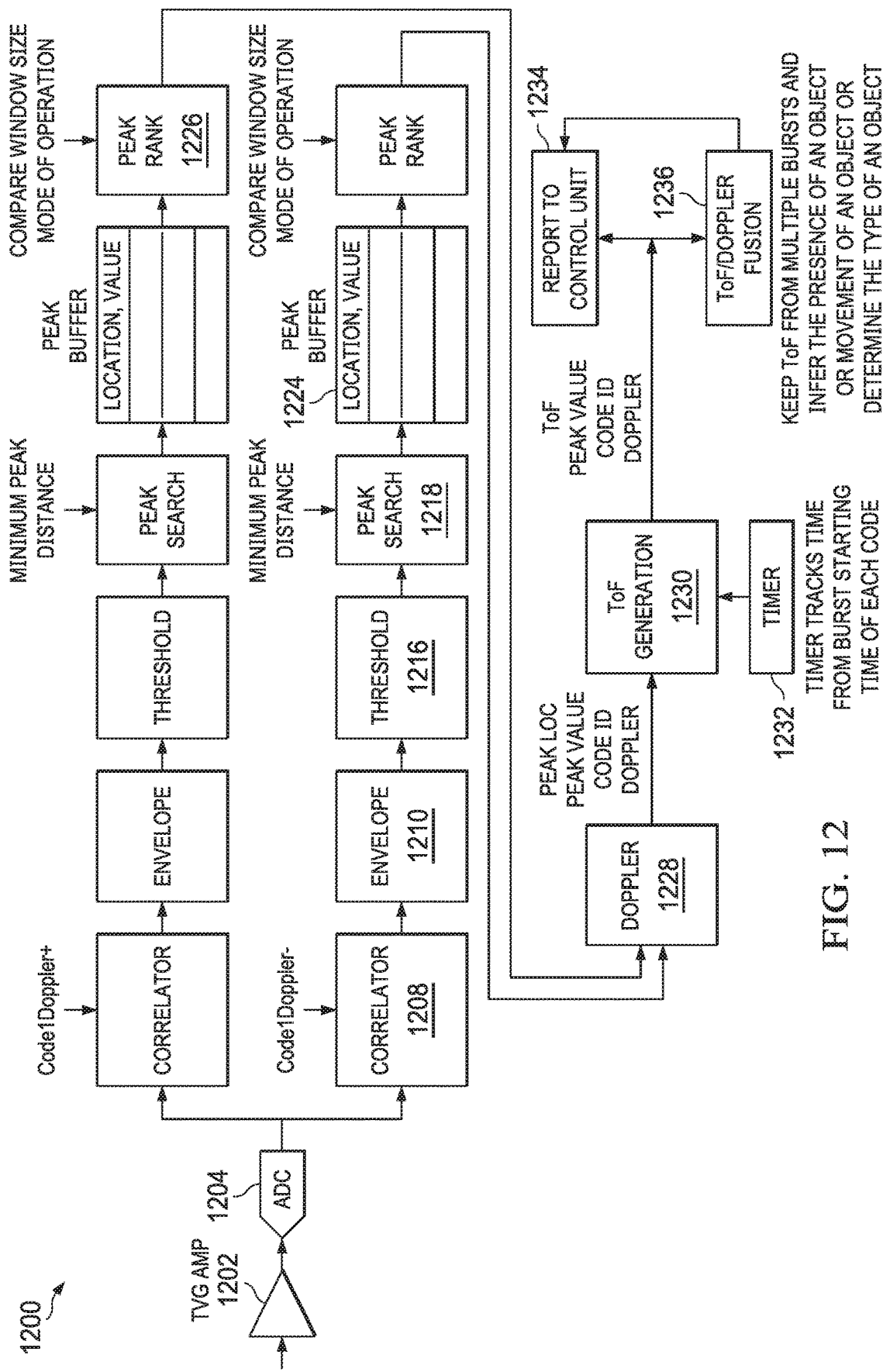
FIG. 12 is a block diagram of an example portion of a received signal processing path in an ultrasonic transducer controller.

FIG. 12 shows another example receiver signal path 1200 in a system that employs coded processing with Doppler coding to distinguish two or more coded signals, e.g., from two or more different ultrasonic transducers each emitting a burst signature having its own signature frequency-modulation code. As noted above, reflected ultrasonic signals can be detected by an ultrasonic transducer and used to measure round-trip time to thereby determine distance to the object which reflected the ultrasonic signals. For a zero relative velocity between the ultrasonic transducer and object to reflect the ultrasonic signals (e.g., the automobile is stationary with respect to an object), the round-trip time can be readily and accurately determined. However, for a non-zero relative velocity between the ultrasonic transducer and the object, Doppler shift is created in the received ultrasonic signal. That is, the frequency of the received ultrasonic signals will be different than the frequency of the transmitted by the transducer in the first place. As the distance between the transducer and the object increases over time, the frequency of the received ultrasonic signal is lower than that of the transmitted signal, and vice versa. The relative velocity between transducer and object can be due to the automobile moving away from or towards a stationary object, the object may be moving and the automobile may be stationary, or both automobile and object may be in motion.

Peak amplitude information and Doppler template information are useful to calculate Doppler frequency shift and correct Doppler-related peak location shift. Example 1200 is therefore directed to an ultrasonic sensing system that can determine the Doppler shift for an object that is moving relative to the ultrasonic transducer(s). The system determines the round-trip time of the sound waves between the transducer and the object, determines the Doppler shift and corrects the measured time for the Doppler shift. The measured Doppler shift also or alternatively can be used to generate a message, alert, announcement, etc. that an object is drawing nearer the sensor or is moving away from the sensor.

Stages 1202, 1204, 1208, 1210, 1216, 1218, 1224, 1226, 1230, 1232, 1234, and 1236 in receiver signal path 1200 of FIG. 12 are numbered correspondingly to stages 502, 504, 508, 510, 516, 518, 524, 526, 530, 532, 534, and 536 in receiver signal path 500 of FIG. 5A and function similarly, as already described above with respect to receiver signal path 500. The Doppler effect, caused by a moving target/obstacle relative to the ultrasonic transducer, causes a frequency-shifted echo that can be accommodated with a corresponding frequency-shifted template. Therefore, a template specific to a Doppler-shifted frequency can be generated to enable detection of the Doppler effect so that the relative velocity of object and transducer can be understood.

In the example receiver signal path 1200 of FIG. 12, the peak buffer 1224 of each respective parallel signal processing path can determine whether a Code1Doppler or a Code2Doppler reflection is observed. A valid peak produced by the two peak rank branches 1226 goes through the Dopper stage 1228, which is configured to do additional processing to associate the peaks from these two peak rank stages 1226. Accordingly, peak amplitude information and Doppler template information can be used to calculate Doppler frequency shift and correct Doppler-related peak location shift. Doppler shift processing of the type employed here is described further in U.S. patent application Ser. No. 16/232,308, filed 26 Dec. 2018, and entitled "Ultrasonic Echo Processing in Presence of Doppler Shift." This application is herein incorporated by reference.

Figure 13:
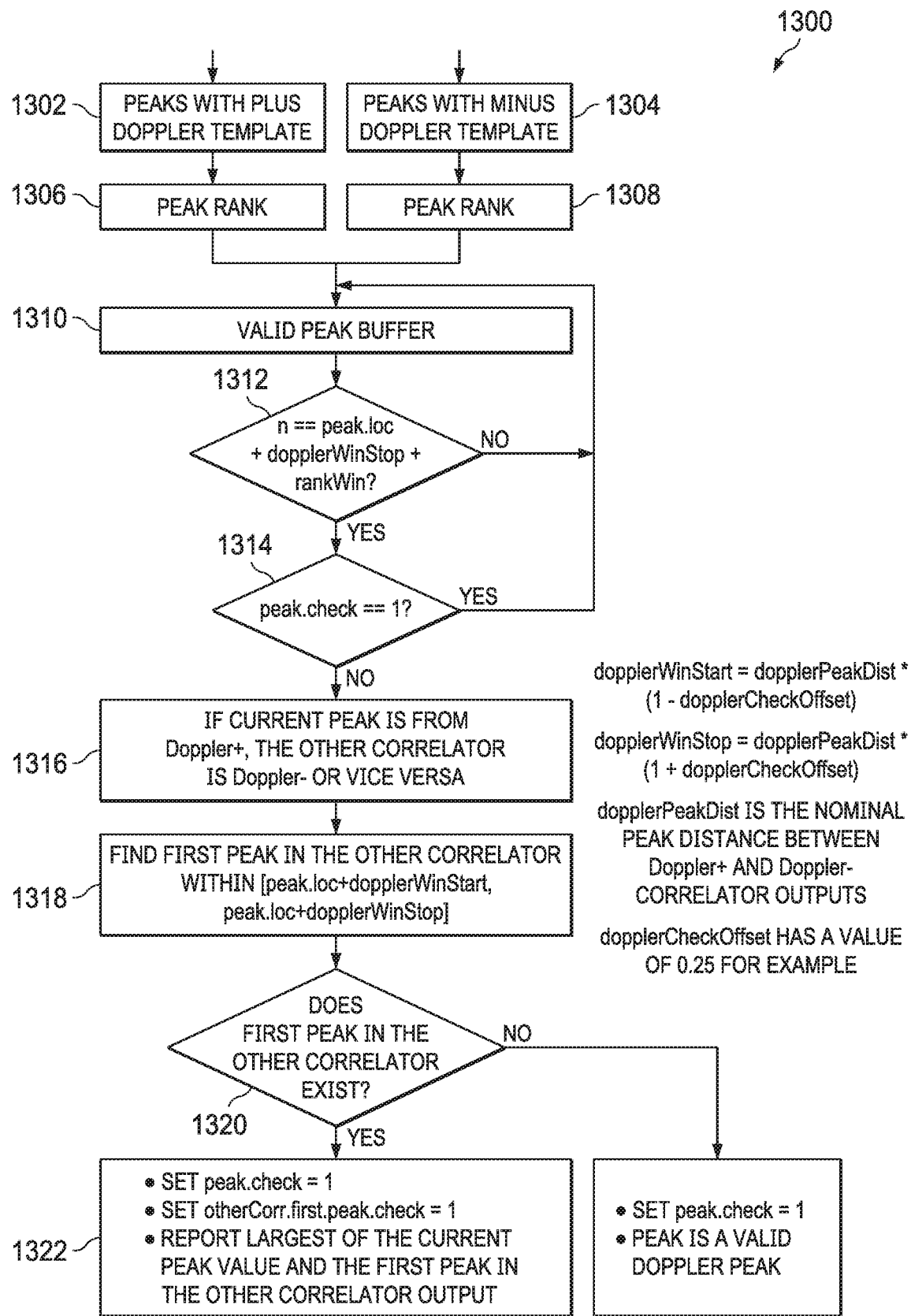
FIG. 13 is a flow chart illustrating a method of Doppler processing.

FIG. 13 is a flow chart illustrating a Doppler shift processing method 1300. Two correlators, one with a Doppler template that has a plus Doppler shift, and the other one with a Doppler template that has a minus Doppler shift, provide respective peaks 1302, 1304 as inputs to method 1300. The two templates are generated by decimating the TX bursting pattern with a decimation ratio that is adjusted by the desired amount of Doppler shift, as described in U.S. patent application Ser. No. 16/232,308. The peaks from each correlator first go through respective peak ranking 1306, 1308 to eliminate side lobe peaks. Valid peaks after the peak ranking 1306, 1308 are written 1310 to a valid peak buffer. If 1312 the current time index is equal to the location of a peak in the valid peak buffer plus the Doppler window stop number plus the rank window size, and if 1314 the peak has not been checked, then checking is performed on the peak. First, it is determined 1316 if there is any peak in the checking window (peak.loc+dopplerWinStart to peak.loc+dopplerWinStop) in the other correlator output (if the current peak is from the correlator with plus Doppler shift, the other correlator is the one with minus Doppler shift, or vice versa). If 1320 there is a peak in the other correlator output, pick 1322 the first peak. Mark 1322 the first peak from the other correlator and current peak being checked as checked. Report 1322 the amplitude, location, correlator number of the largest of the two peaks. If 1320 there is no peak in the other correlator output, mark 1324 the current peak as checked. Report 1324 the amplitude, location, correlator number of the peak.

Figure 14:
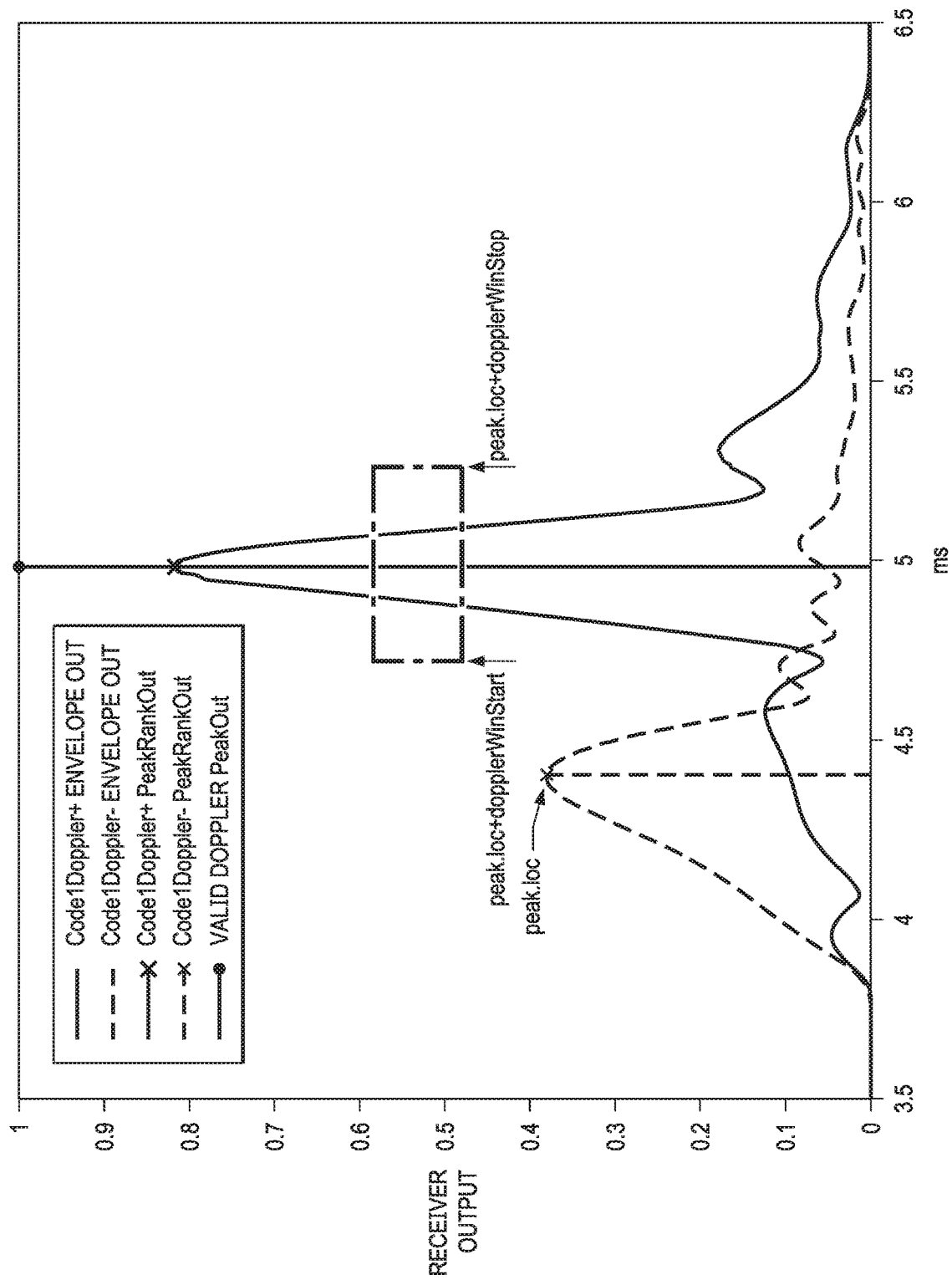
FIG. 14 is a graph of example correlator outputs using Doppler processing.

The values dopplerWinStart and dopplerWinStop in method 1300 in FIG. 13 can calculated as shown in FIG. 14. The nominal Doppler peak distance dopplerPeakDist is the nominal peak distance between the two correlator outputs for an echo coming in. This can be programmed through register settings or recorded from the burst signal. (In the latter case, when the transducer bursts, the burst signal also couples electrically back to the receiver. The coupled burst signal generates a large peak at the first correlator output, and a large peak at the second correlator output. The distance between the two peaks can be recorded and used as the nominal peak distance dopplerPeakDist.) The value dopplerCheckOffset can be, for example, programmed by the user. It can be set as 0.25, for example. Accordingly, designating each of the Doppler peaks as either valid or invalid can include, for each peak being checked, establishing a time window by adding two values to the time of the peak being checked to establish respective start and end times of the time window based on a nominal Doppler peak distance, searching for a peak within the time window, in the other of the first or second Doppler envelope from the Doppler envelope in which the peak being checked resides; and comparing the peak being checked to the peak within the time window and designating only the larger of the peak being checked and the peak in the time window as a valid peak.

Whereas receiver signal path 1200 represents a two-code example, in other examples (not illustrated), receiver signal path 1200 can have four parallel processing paths involving four burst codes (Code1, Code2, Code1 Doppler, and Code2Doppler), and can merge the regular and Doppler paths in Doppler stage 1228.

Figure 15A:
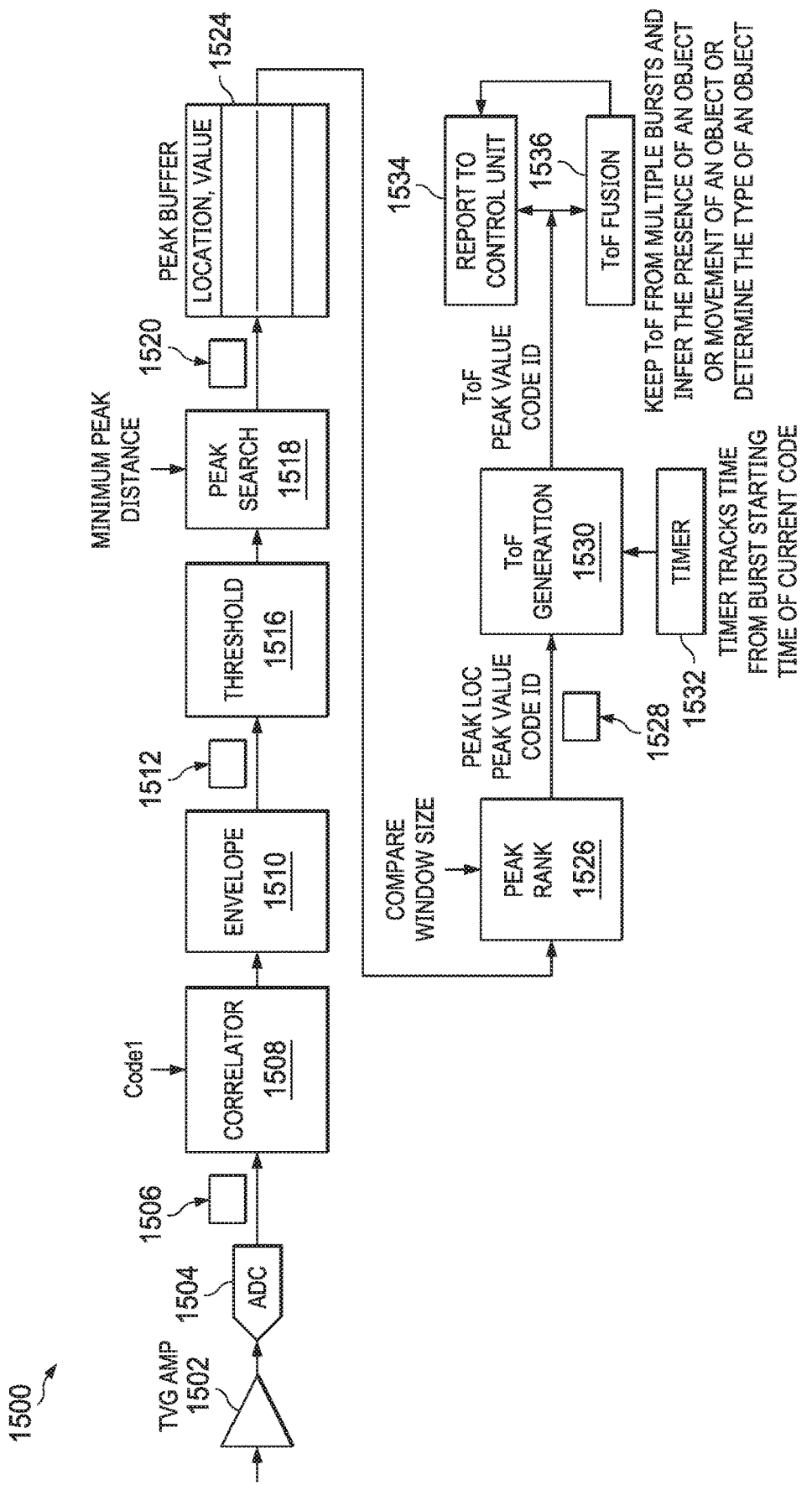
FIG. 15A is a block diagram of an example portion of a received signal processing path in an ultrasonic transducer controller.
Figure 15C:
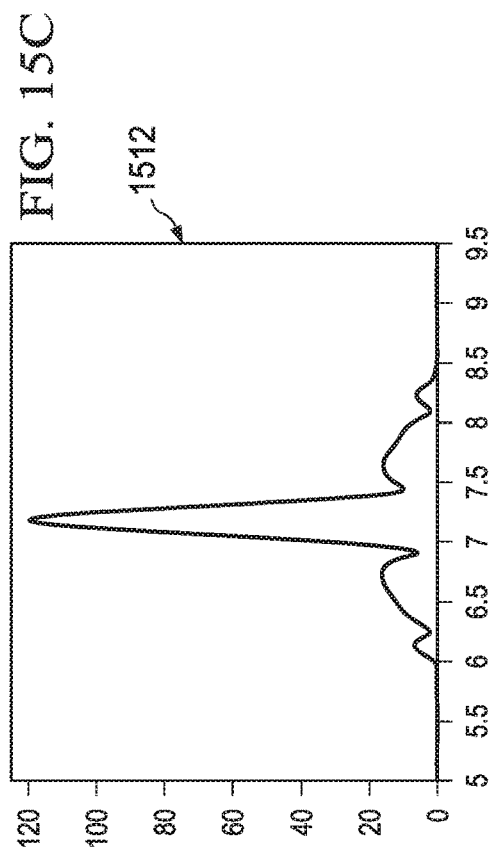
FIGS. 15B-15E are signal plots referred to in FIG. 15A.
Figure 15E:
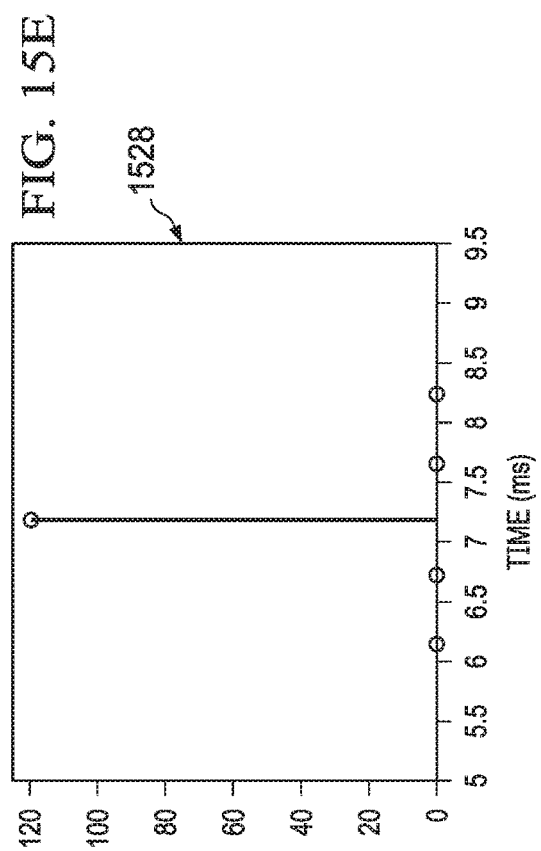
Figure 15B:
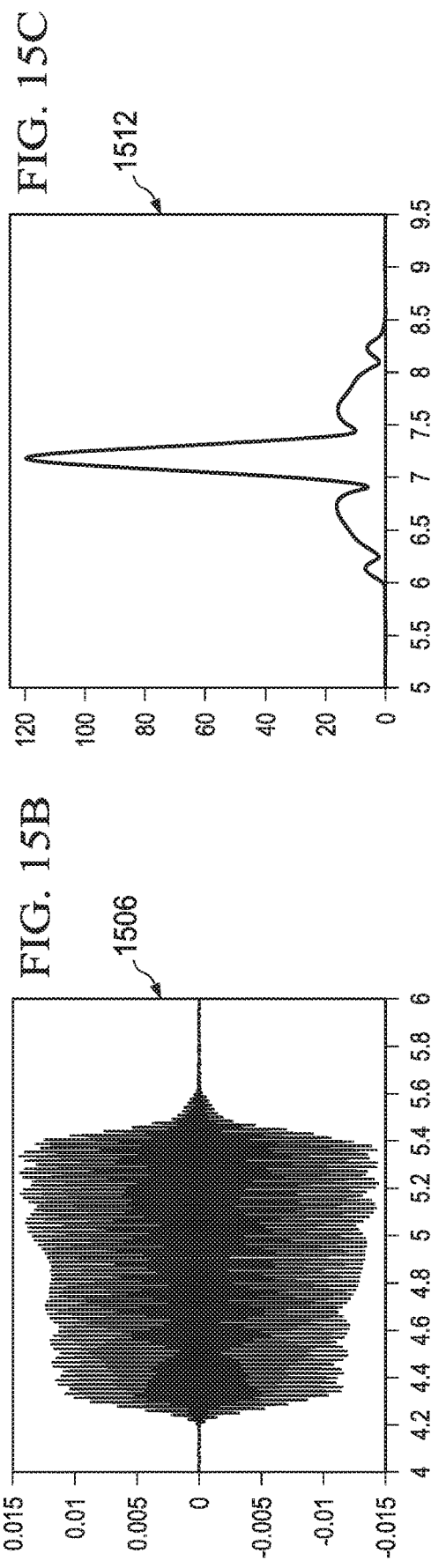
Figure 15D:
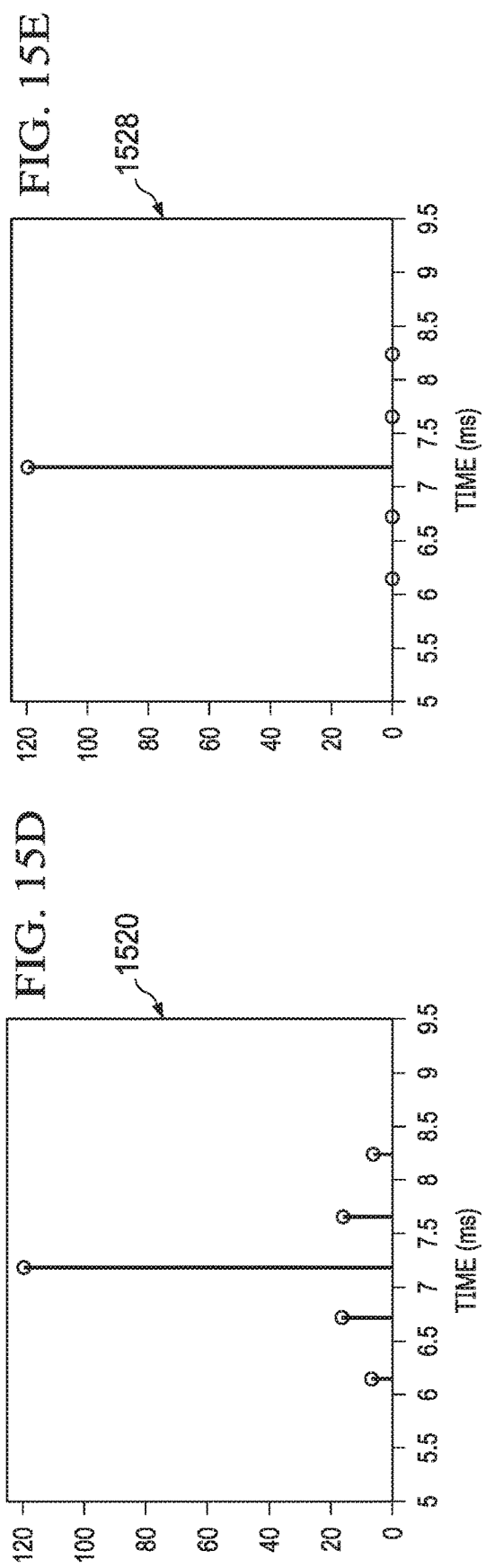

FIG. 15A shows still another example receiver signal path 1500 in a system that employs coded processing, but involves only one burst code, denoted Code1, which may produces side lobes in the generated envelope 1512, as shown in FIG. 15C. Stages 1502, 1504, 1508, 1510, 1516, 1518, 1524, 1526, 1530, 1532, 1534, and 1536 in receiver signal path 1500 of FIG. 15A are numbered correspondingly to stages 502, 504, 508, 510, 516, 518, 524, 526, 530, 532, 534, and 536 in receiver signal path 500 of FIG. 5A and function similarly, as already described above with respect to receiver signal path 500. Graphs 1506, 1512, and 1520 shown in FIGS. 15B, 15C, and 15D, respectively, are thus similar to graphs 506, 512, and 520 shown in FIGS. 5B, 5C, and 5E, respectively. However, in receiver signal path 1500, peak rank stage 1526 is configured to eliminate side lobes and only retain a main peak, as shown in graph 1528 in FIG.

5E. Graph 1512, shown in FIG. 15C, has a side lobe ratio associated with the relative amplitudes of its main peak and its subsidiary peaks, and when receiver signal path 1500 performs a peak comparison, within the aforementioned search window, the system finds the maximum peak, and then multiplies the amplitude of the maximum peak by the side lobe ratio (e.g., 0.25) to calculate the side lobe threshold level. Then, if a peak is lower than the side lobe threshold level, it is not validated as a valid peak.

The time-of-flight detection can be simplified, e.g., from that of example receiver signal path 500 or example receiver signal path 1200 to that of example receiver signal path 1500, when only one code is "in the air" (i.e., when only a burst of one signature code has been emitted and its expected reflection receipt time is unexpired). If there are no side lobes in the autocorrelation output, then time-of-flight can be determined by threshold crossing, or from the location of any peaks in the peak search output. If side lobes are present, then some peaks can come from the side lobes of a dominant peak.

Figure 16:
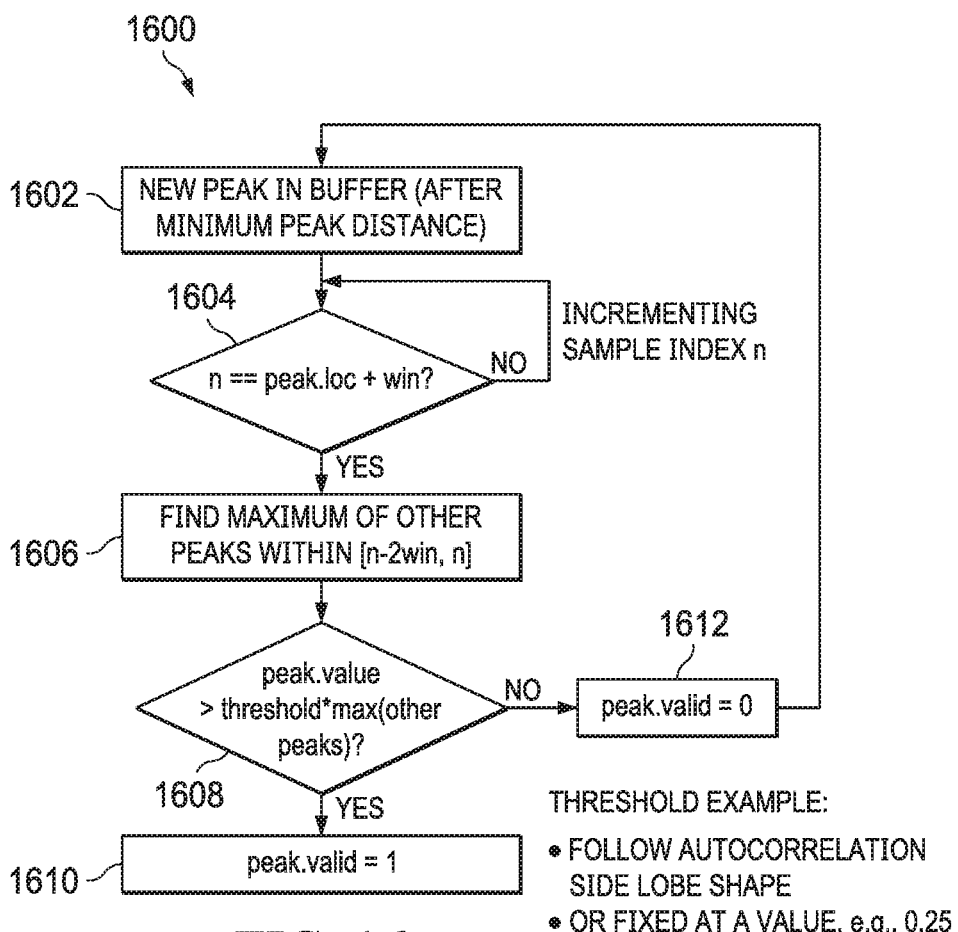
FIG. 16 is a flow diagram of an example peak validation method.

FIG. 16 illustrates a method 1600 that can be used to eliminate such side lobe peaks. Method 1600 is similar to the peak rank method 1000 of FIG. 10 in performing dominant peak detection, and method parts 1602, 1604, 1606, 1610, and 1612 correspond to, and function the same as, similarly-numbered method parts 1002, 1004, 1006, 1010, and 1012, as described above with respect to FIG. 10. The difference in method 1600 of FIG. 16 is that instead of checking other correlator outputs, as in 1008, method 1600 checks other peaks in the same correlator output and determines 1608 if the current peak is the side lobe of another dominant peak vis-à-vis a threshold. The threshold can vary based on the autocorrelation output shape or fixed at a value, for example, 0.25 times the amplitude of a maximum peak within the search window. This search window is effectively the same as the previously described search window of width 2win. From the current sample n, it is of width from n−2win to n. From the peak location, it is from peak.loc−win to peak.loc+win. Elimination of side lobe peaks can additionally or alternatively be accomplished with appropriate higher adjustment of the time-varying threshold in the threshold stage 1516 following the envelope stage 1510.

Example ultrasonic detection systems can also perform automated mode switching between the various example receiver signal paths 500, 1200, 1500 based on various criteria, such as the expected number of "codes in the air" (i.e., the number of different burst patterns recently emitted by multiple of the transducers in the system for which an expected echo timeout has not expired). For example, a central controller can report to a controller containing the receiver pathway that only one code is in the air, prompting a mode switch to the pathway example 1500. Thereafter, a report that multiple codes are in the art can prompt a mode switch to example 500 or 1200. Thus, the system can be configured to automatically switch between a single-correlator configuration having a single signal-processing path, based on a signal from a central controller indicating that burst patterns have not been emitted by different transducers in the system for which expected echo timeouts have not expired, and a multiple-correlator configuration having multiple signal-processing paths, based on a signal from a central controller indicating that burst patterns have been emitted by different transducers in the system for which expected echo timeouts have not expired.

Figure 17:
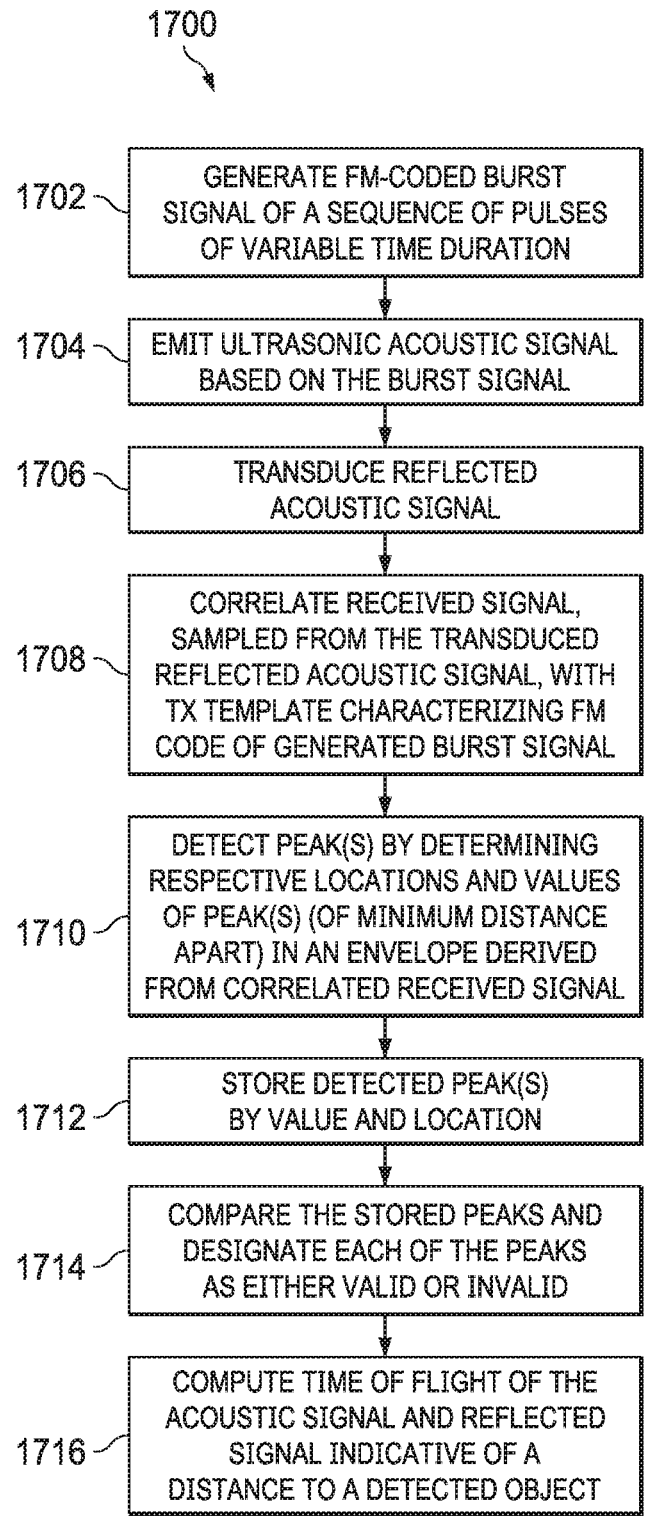
FIG. 17 is a flow chart illustrating an example method of ultrasonic detection.

FIG. 17 illustrates a method 1700 of ultrasonic detection. A frequency-modulation-coded burst signal comprising a sequence of pulses of variable time duration is generated 1702. An ultrasonic acoustic signal based on the burst signal is emitted 1704. A reflected acoustic signal is then transduced. A received signal, sampled from the transduced reflected acoustic signal, is correlated 1708 with a transmission template characterizing a frequency-modulation code of the generated burst signal. One or more peaks are then detected 1710 by determining the respective locations and amplitudes of peaks in an envelope derived from the correlated received signal. The detection 1710 operates to ensure that the detected peaks each have a predefined minimum distance apart from each other. The detected peaks are then stored 1712 by their amplitudes and locations, and the stored peaks are compared with each other 1714 to designate each of them as either valid or invalid. A time of flight of the acoustic signal and the reflected acoustic signal, indicative of a distance between to a detected object, can then be computed 1716. This method can be carried out, for example, by an ultrasonic detection system that includes any of the receiver signal paths 500, 1200, or 1500 illustrated in FIGS. 5A, 12, and 15A, respectively.

The systems and methods described herein can use one or more parallel receiver signal processing paths each having a correlator configured to correlate a received signal to a transmit template, a peak search stage configured to search for peaks with a specified minimum peak distance between peaks, a peak buffer configured to store peak search outputs, and a peak rank stage configured to compare multiple correlator outputs, together to improve distinguishing of received coded ultrasonic reflections when multiple ultrasonic transducers burst contemporaneously. The systems and methods described herein can also advantageously provide reduction of side lobes of correlator outputs when only one code is in the air. The systems and methods described herein can further advantageously permit for detection of smaller obstacles that might otherwise be obscured by larger obstacles, by reporting both dominant and secondary peaks. The systems and methods described herein further are able to accommodate Doppler processing for detection of obstacles that are moving relative to the ultrasonic detection transducer(s). The systems and methods described herein allow simultaneous bursting of multiple sensors, which reduces scan time and improves system responsiveness. They also permit using a coded burst waveform, which is more robust against interference. Moreover, they are configurable to detect either dominant peaks only or both dominant peaks and secondary peaks for improved detection of small targets/obstacles in front of larger ones. They can calculate time of flight based on burst times of multiple sensors, and can use time-of-flight fusion to track multiple bursts over time (i.e., can combine echo information from multiple consecutive bursts) to remove false echoes.

The systems described herein can be implemented, and the methods described herein can be carried out, using an application-specific integrated circuit (ASIC) or multiple ASICs. In some examples, the systems and methods can be implemented or carried out using a general-purpose digital electronic computer programmed to carry out the signal processing involved in the correlator, envelope stage, threshold stage, peak search stage, peak buffer stage, peak rank stage, and time-of-flight generation stage as software instructions.

In this description, the term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. An ultrasonic sensing system comprising:
    a first ultrasonic transducer configured to emit a first ultrasonic acoustic burst signal representing a first code;
    a second ultrasonic transducer configured to emit a second ultrasonic burst signal representing a second code;
    a sensor having a sensor output and configured to receive an acoustic signal, convert the acoustic signal to a sensor signal, and provide the sensor signal at the sensor output;
    a first correlator having a first correlator input and a first correlator output, the first correlator input coupled to the sensor output, and the first correlator configured to:
        generate a first correlation result responsive to a correlation between the sensor signal and the first code; and
        provide the first correlation result at the first correlation output;
    a second correlator having a second correlator input and a second correlator output, the second correlator input coupled to the sensor output, and the second correlator configured to:
        generate a second correlation result responsive to a correlation between the sensor signal and, the second code; and
        provide the second correlation result at the second correlation output; and
    a processing circuit having a first processing input, a second processing input, and a processing output, the first processing input coupled to the first correlator output, the second processing input coupled to the second correlator output, and the processing circuit configured to:
        perform a comparison between a first peak of the first correlation result and a second peak of the second correlation result;
        determine whether the first peak represents an echo of the first ultrasonic burst signal based on the comparison;
        responsive to determining that the first peak represents the echo, determine a time of reception of the echo;
        compute a time-of-flight of the first ultrasonic burst signal based on the time of reception of the echo; and
        provide the time-of-flight at the processing output.

2. The system of claim 1, wherein:
    the first peak is one of first peaks of the first correlation result within a timing window;
    the second peak is one of second peaks of the second correlation result within the time window; and
    the processing circuit is configured to, responsive to determining that the first peak is a maximum peak among the first peaks within the timing window and the first peak has a higher amplitude than each of the second peaks, determine that the first peak represents the echo of the first ultrasonic burst signal.

3. The system of claim 2, further comprising:
    a third correlator having a third correlator input and a third correlator output, the third correlator input coupled to the sensor output, and the third correlator configured to:
        generate a third correlation result responsive to a correlation between the sensor signal and a third code, the third code representing the first ultrasonic acoustic burst signal experiencing a positive Doppler frequency shift; and
        provide the third correlation result at the third correlation output; and
    a fourth correlator having a fourth correlator input and a fourth correlator output, the fourth correlator input coupled to the sensor output, and the fourth correlator configured to:
        generate a fourth correlation result responsive to a correlation between the sensor signal and a fourth code, the fourth code representing the first ultrasonic acoustic burst signal experiencing a negative Doppler frequency shift; and
        provide the fourth correlation result at the fourth correlation output.

4. The system of claim 3. wherein the comparison is a first comparison; and
    wherein the processing circuit has a third processing input coupled to the third correlation output and a fourth processing input coupled to the fourth correlation output, and the processing circuit is configured to:
    perform a second comparison between a third peak of the third correlation result and a fourth peak of the fourth correlation result; and
    extract Doppler information based on the second comparison.

5. The system of claim 2, wherein the comparison is a first comparison, and the processing circuit is configured to:
    select first subsets of the first correlation result within respective timing windows, each respective timing window centered at a respective peak of the first peaks;
    select second subsets of the second correlation result within the respective timing windows;
    perform a second comparison between first peaks of the first subset of the first correlation result and second peaks of the second subset of the second correlation result within each timing window; and determine whether the sensor signal within each timing window includes the echo of the first ultrasonic burst signal based on the second comparison.

6. The system of claim 5, wherein the timing window is a first, timing window, the echo is a first echo, the time of reception is a first time of reception, the time-of-flight is a first time-of-flight, and the processing circuit is configured to:
based on an amplitude of a third peak exceeding a threshold, determine that the third peak of the first correlation result in a second timing window is a second echo of the first ultrasonic burst signal, the amplitude of the third peak being lower than an amplitude of the first peak;
determine a second time of reception of the second echo;
compute a second time-of-flight of the first ultrasonic burst signal based on the second time of reception of the second echo; and
provide the second time-of-flight at the processing output.

7. The system of claim 6, wherein the threshold is based on one quarter of the amplitude of the first peak; and
wherein the third peak is determined to be the second echo based on a time difference between the third peak and the first peak being within half of the first or second timing windows.

8. The system of claim 1, wherein the processing circuit is configured to filter the first and second correlation results by comparing amplitudes of peaks of the first and second correlation results with respective first and second thresholds to eliminate peaks representing sidelobes of the respective first and second ultrasonic burst signals; and
wherein the first peak and the second peaks are determined from the respective filtered first and second correlation results.

9. The system of claim 8, wherein the first threshold is based on a first autocorrelation output shape generated by the first correlator, and the second threshold is based on a second autocorrelation output shape generated by the second correlator.

10. The system of claim 8, wherein the first threshold and the second threshold are set at one quarter of an amplitude of a maximum peak of the respective first and second correlation results within a search window.

11. The system of claim 1, wherein the processing circuit is configured to filter the first and second correlation results by removing peaks that are separated by a time difference less than a threshold; and
wherein the first peak and the second peaks are determined from the respective filtered first and second correlation results.

12. The system of claim 11, wherein the processing circuit is configured to, responsive to determining that a third peak and a fourth peak of the first correlation result are separated by a time difference less than the threshold, and that the fourth peak has a larger amplitude than the third peak, retain the fourth peak and remove the third peak in the filtered first correlation result.

13. A method of ultrasonic detection comprising:
from a first ultrasonic transducer, emitting a first ultrasonic acoustic burst signal representing a first code;
from a second ultrasonic transducer, emitting a second ultrasonic acoustic burst signal representing a second code; at a sensor, receiving an acoustic signal, and converting the acoustic signal to a sensor signal;
generating a first correlation result responsive to a correlation between the sensor signal and the first code;

generating a second correlation result responsive to a correlation between the sensor signal and the second code;
performing a comparison between a first peak of the first correlation result and a second peak of the second correlation result;
determining whether the first peak represents an echo of the first ultrasonic burst signal based on the comparison;
responsive to determining that the first peak represents the echo, determining a time of reception of the echo; and
computing a time-of-flight of the first ultrasonic burst signal based on the time of reception of the echo.

14. The method of claim 13, wherein:
the first peak is one of first peaks of the first correlation result within a timing window;
the second peak is one of second peaks of the second correlation result within the time window; and
the first peak is determined to represent the echo of the first ultrasonic burst signal based on the first peak being a maximum peak, among the first peaks within the timing window and the first peak having a higher amplitude than each of the second peaks.

15. The method of claim 14, further comprising:
generating a third correlation result responsive to a correlation between the sensor signal and a third code, the third code representing the first ultrasonic acoustic burst signal experiencing a positive Doppler frequency shift; and
generate a fourth correlation result responsive to a correlation between the sensor signal and a fourth code, the fourth code representing the first ultrasonic acoustic burst signal experiencing a negative Doppler frequency shift.

16. The method of claim 15, further comprising extracting Doppler information based on comparing a third peak of the third correlation result and a fourth peak of the fourth correlation result.

17. The method of claim 13, further comprising: filtering the first and second correlation results by comparing amplitudes of peaks of the first and second correlation results with respective first and second thresholds to eliminate side lobe peaks; and
wherein the first peak and the second peaks are determined from the respective filtered first and second correlation results.

18. An ultrasonic sensing system comprising:
an ultrasonic transducer configured to emit an ultrasonic burst signal representing a code, the ultrasonic burst signal having a mainlobe and a sidelobe;
a sensor having a sensor output and configured to receive an acoustic signal, convert the acoustic signal to a sensor signal, and provide the sensor signal at the sensor output;
a correlator having a correlator input and a correlator output, the correlator input coupled to the sensor output, the correlator configured to:
generate a correlation result responsive to a correlation between the sensor signal and the code; and
provide the correlation result at the correlation output; and
a processing circuit having a processing input and a processing output, the processing input coupled to the correlator output, and the processing circuit configured to:
filter the correlation result to eliminate peaks representing the sidelobe of the ultrasonic burst signal;

determine, from the filtered correlation result, that a peak represents an echo of the mainlobe of the ultrasonic burst signal;

determine a time of reception of the echo;

compute a time-of-flight of the ultrasonic burst signal based on the time of reception; and provide the time-of-flight at the processing output.

19. The system of claim 18, wherein the processing circuit is configured to:

determine, from a subset of the correlation result within a timing window, a maximum peak;

determine a threshold based on a pre-determined ratio of an amplitude of the maximum peak; and filter the subset of the correlation result by eliminating peaks having an amplitude below the threshold from the filtered correlation result.

20. The system of claim 18, wherein the processing circuit is configured to determine that the peak represents the echo of the ultrasonic burst signal based on an amplitude of the peak exceeding a threshold.

* * * * *